Inventors
Robert B. Dunlap
Jacob S. Kamborian
by Roberts, Cushman & Grover
Attys Inventors
Robert B. Dunlap
Jacob S. Kamborian
by Roberts, Cushman & Grover
Att'ys

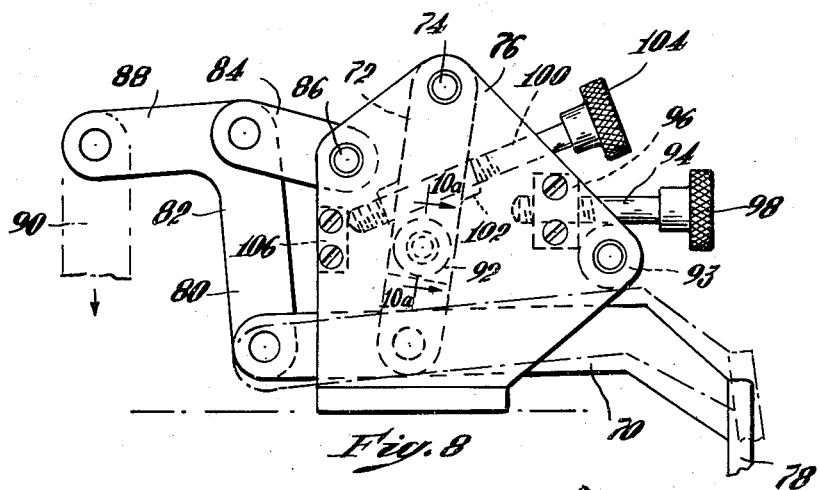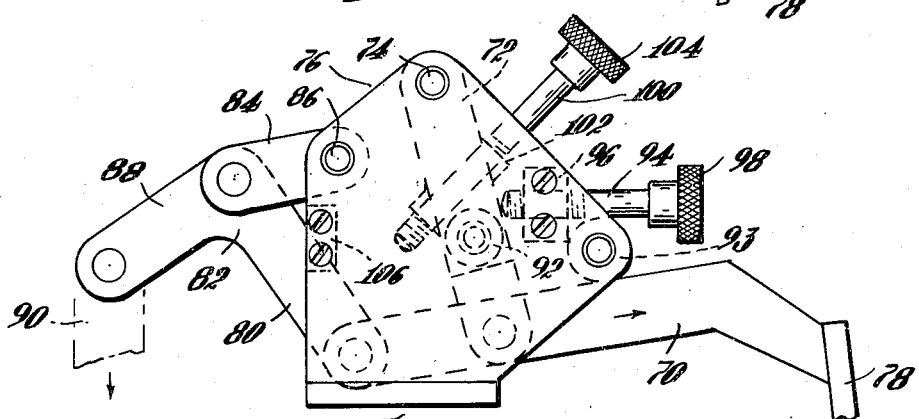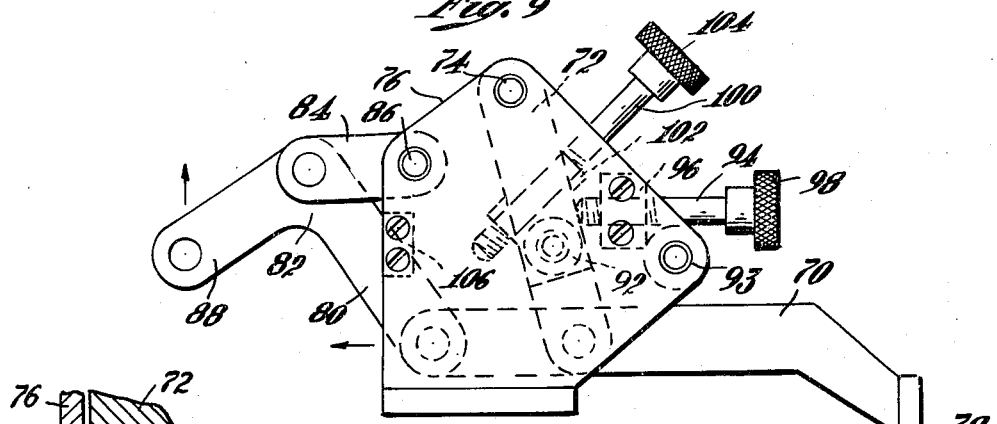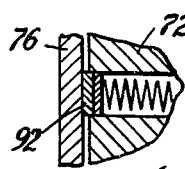

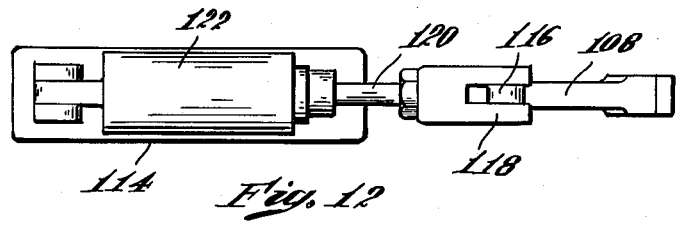
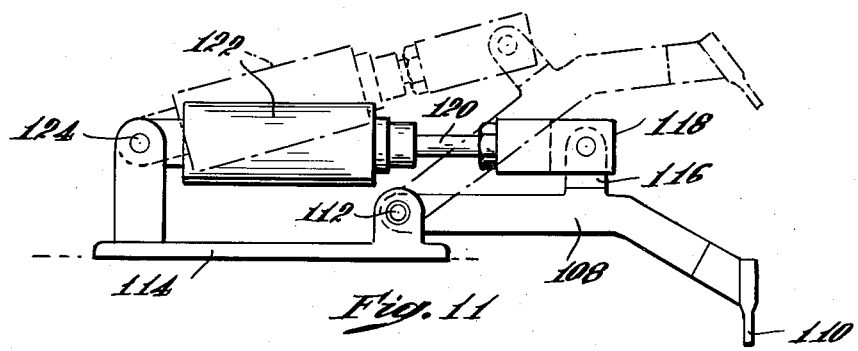
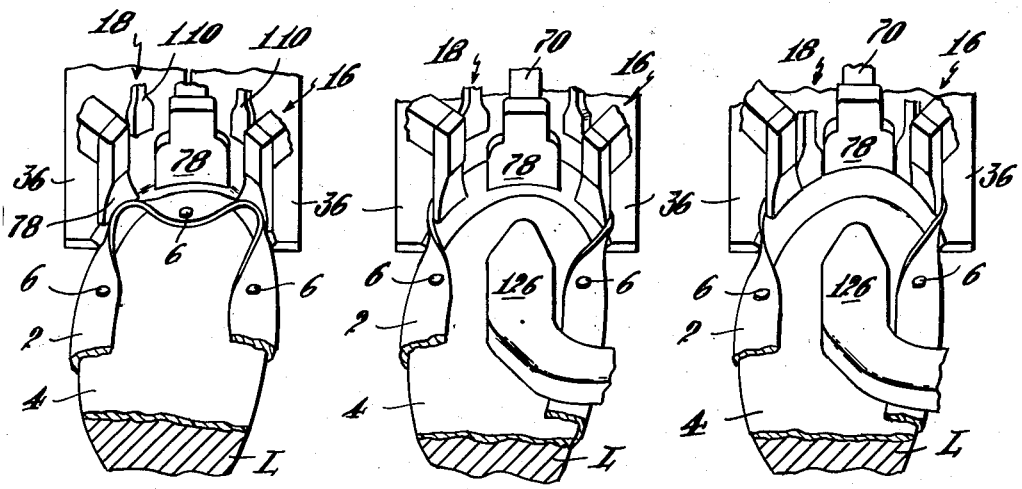

Dec. 5, 1961  R. B. DUNLAP ET AL  3,011,186
TOE LASTING MACHINE
Filed Dec. 4, 1958  12 Sheets-Sheet 8

Inventors
Robert B. Dunlap
Jacob S. Kamborian
by Roberts, Cushman + Grover
Attys

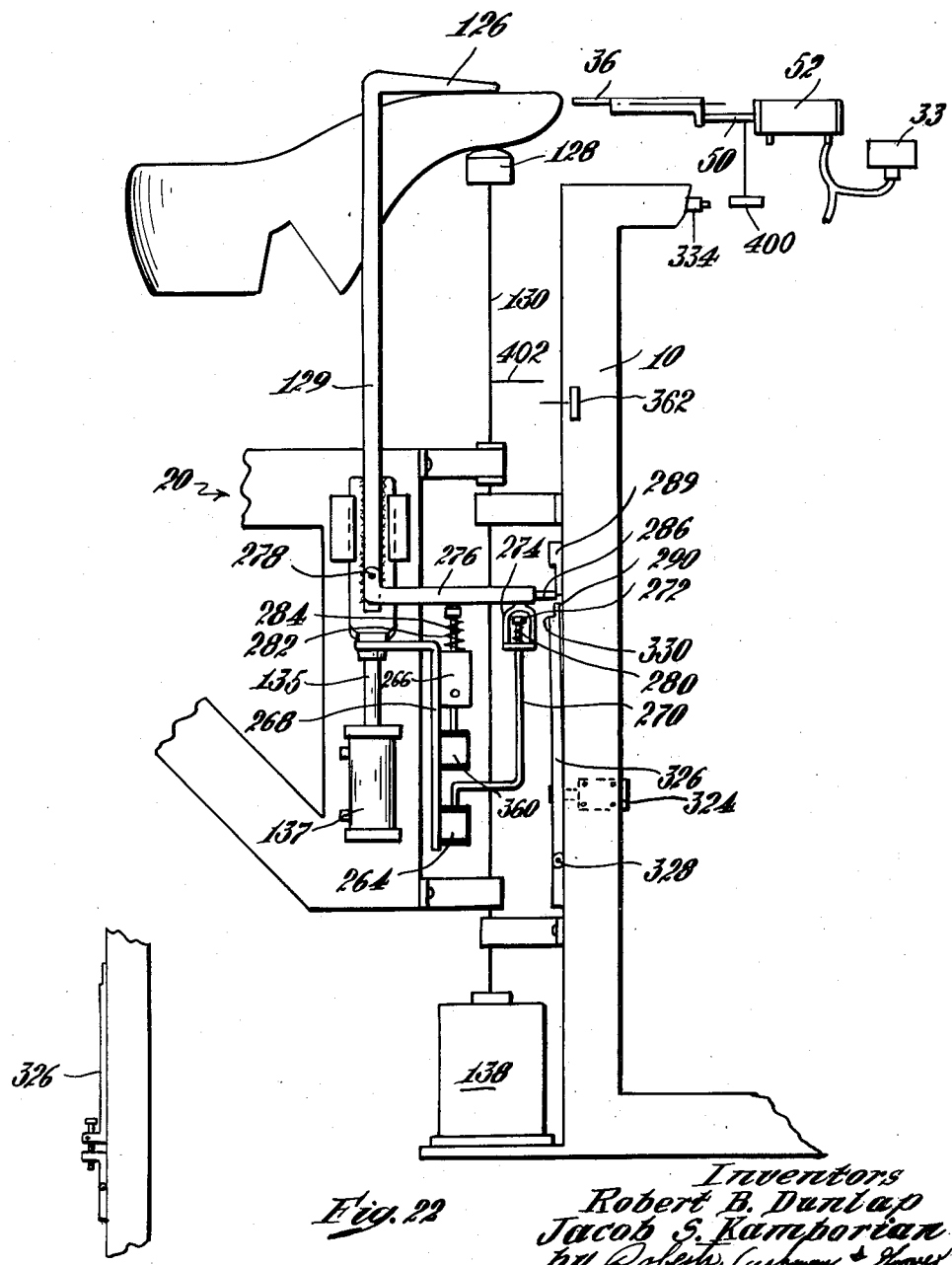

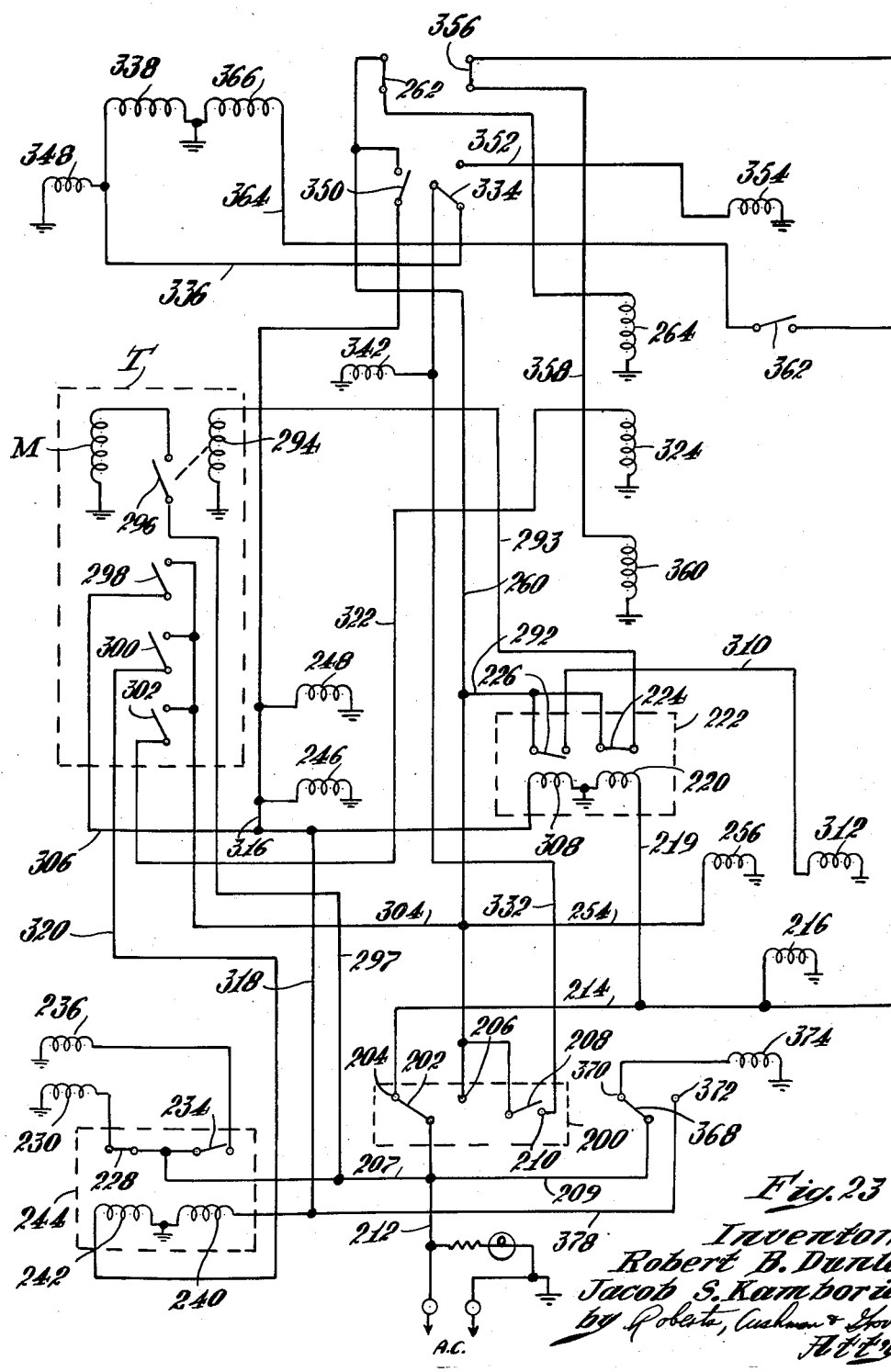

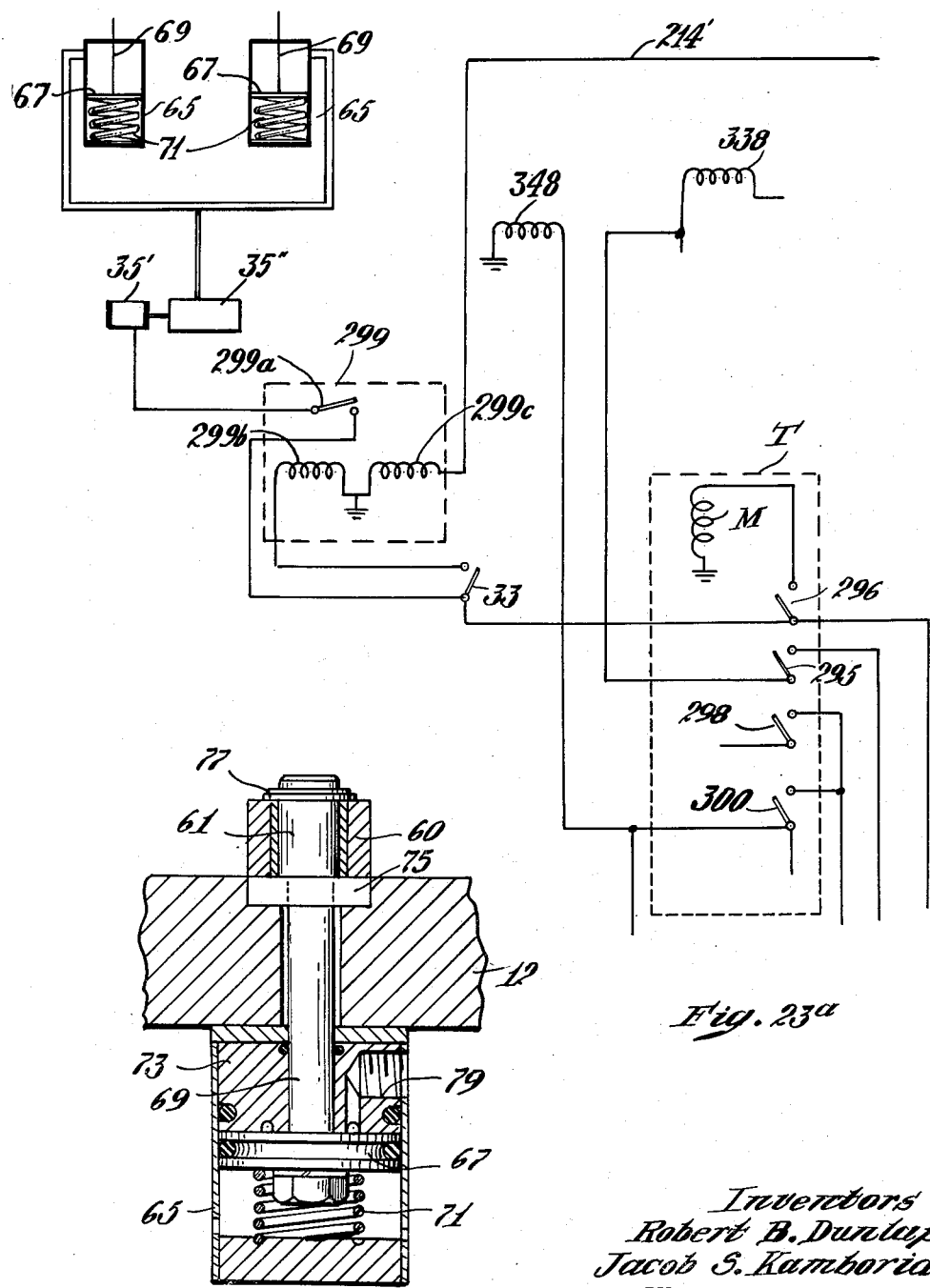

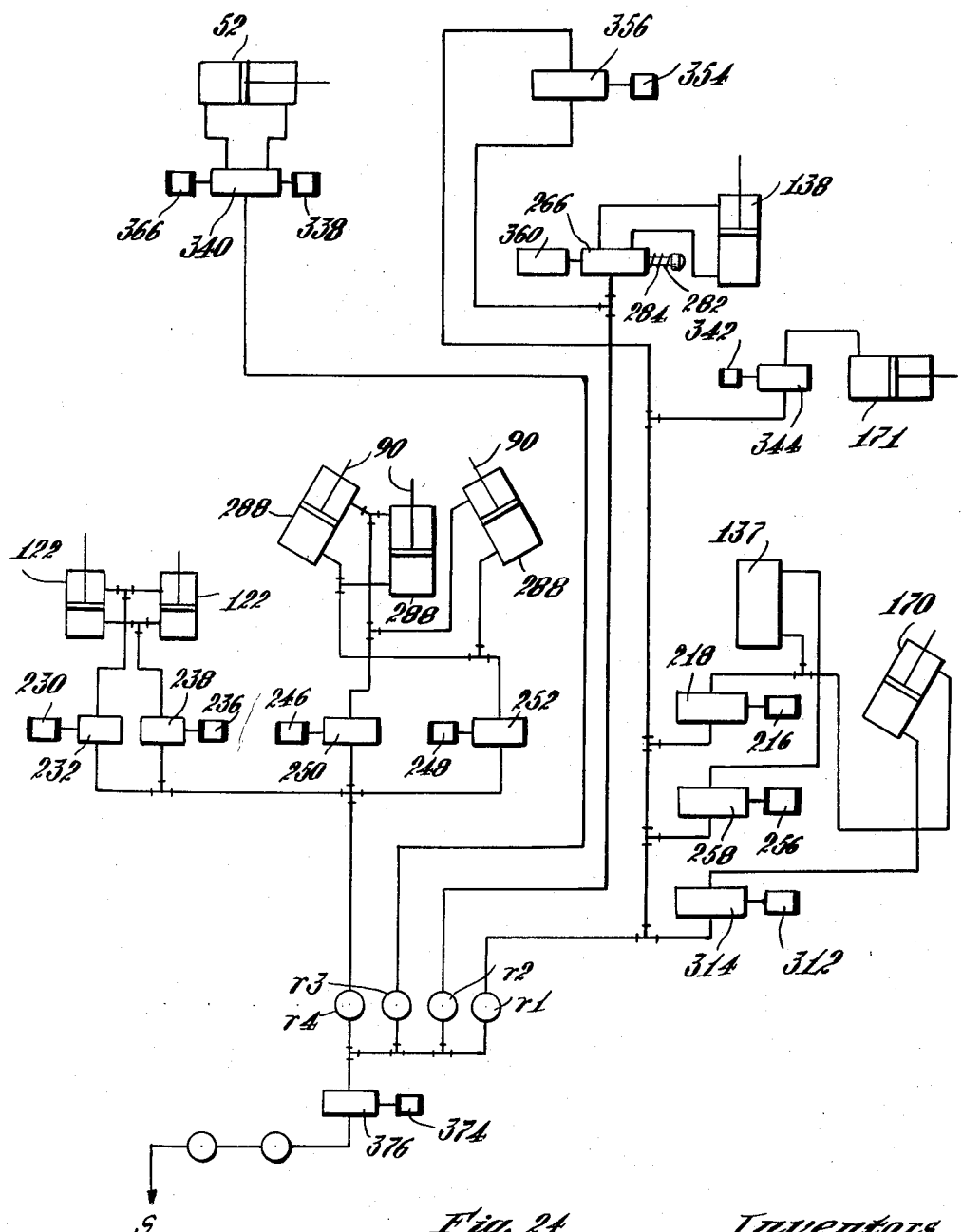

United States Patent Office 3,011,186
Patented Dec. 5, 1961

3,011,186
TOE LASTING MACHINE
Robert B. Dunlap, Medway, Mass., and Jacob S. Kamborian, 133 Forest Ave., West Newton, Mass.; said Dunlap assignor to said Kamborian
Filed Dec. 4, 1958, Ser. No. 778,188
46 Claims. (Cl. 12—8.8)

This invention relates to apparatus for lasting the ends of shoes according to the method which forms the subject matter of a pending application Serial No. 762,600, filed September 22, 1958, in the name of Jacob S. Kamborian, and has for its principal objects to provide an apparatus which is semiautomatic, to wit, that it performs a specified series of operations in response to the actuation of a switch movable through several positions; to provide an apparatus which will automatically compensate for differences in the depths of lasts; to provide an apparatus in which an upper which has previously been assembled on a last, together with an insole, by means of the usual pulling-over machine, can be operated upon to effect lasting without first having to remove the pulling-over tacks or spreading the infolded margin outwardly away from the insole by hand and in such fashion as to insure preservation of the initial centering of the upper on the last attained during the pulling-over operation; to provide an apparatus which will spread the margin outwardly away from the insole so as to expose the latter much more efficiently than can be done by hand and hold it outspread preparatory to and during heightwise stressing to insure a high degree of molding of the upper especially in that area rounding the shoulder of the last; to provide an apparatus in which substantially the entire margin of the outspread upper may be held during heightwise stressing so as to avoid the formation of the wrinkles; to provide apparatus in which any residual or stubborn wrinkles or creases may be removed following heightwise stressing; to provide apparatus in which the stress in the lasting margin may be maintained during wiping and up until the margin has been adhesively or otherwise attached to the insole so as to preserve the tautness imparted thereto; and to provide apparatus which is efficient in operation and requires very little skill on the part of the operator.

As herein illustrated, the apparatus has wiping means operable in a predetermined plane, means mounting a last with an upper and insole assembled thereon, bottom up, in a plane above the upper surface of the wipers, which includes relatively movable clamps for engagement with the top and bottom of the toe and means automatically operable to effect movement of the mounting means and clamps to bring the clamps into engagement with the toe to position the last with the bottom of the insole at a predetermined level with respect to the wipers, preferably above the level of the wipers. A heel clamp is brought into engagement with the heel end of the last at the level established by the toe clamping means. There are instrumentalities disposed above the wipers about the toe operable on the lasting margin at its extreme forward end and at portions spaced laterally thereof at opposite sides to draw the margin outwardly away from the insole so as to uncover the edge of the insole and to fold the margin downwardly into contact with the wipers. Intermediate the endmost instrumentality and the laterally disposed instrumentalities there are additional instrumentalities operable to clamp the intermediate portions of the margin against the wipers. Collectively the instrumentalities frictionally engage and hold a substantially continuous narrow area of the lasting margin against the wipers around the end of the toe. There is means for lowering the mount supporting the last while the margin is thus held clamped against the wipers through a predetermined distance into the plane of the underside of the wipers preparatory to wiping to stress the margin heightwise. The mounting means is supported for movement about an axis near the toe, perpendicular to the plane of the wipers, and when it is in lowered position may be moved laterally from side to side to twist the stressed margin for the purpose of removing stubborn wrinkles. There is means for moving the wipers inwardly over the upper surface of the insole while the margin is snubbed about the edges of the wipers by the spreading and clamping instrumentalities so that stress is maintained at the margin up until it is fully laid down and fastened to the insole. The spreading and clamping instrumentalities relinquish the margin as the wipers near the inner extremity of their movement, whereupon the mounting means is subjected to upward pressure to bed the lasted margin. The wipers are now retracted, the clamping means released so that the shoe can be removed and the mounting means raised to its initial position.

The invention will now be described in greater detail with reference to the accompanying drawings wherein:

FIG. 3a is a fragmentary section of a manual adjustment for bringing the wipers into engagement with the end of the last;

FIG. 8 is an elevation of one of the spreader instrumentalities showing the initial position of the spreader in full lines and the first position in its movement in dotted lines;

FIG. 9 shows the position of the spreader in the second position of its operation;

FIG. 10 shows the wiper in the third position of its operation just before it returns to its initial position, as shown in FIG. 8;

FIG. 10a is a view taken along the line 10a—10a of FIG. 8;

FIG. 11 is a side elevation of one of the clamping instrumentalities shown in dotted lines in its withdrawn position and in full lines in clamping position;

FIG. 12 is a plan view of FIG. 11;

FIG. 13 is a perspective view of the forepart of a shoe showing the location of the spreading and clamping instrumentalities prior to operation on the lasting margin;

FIG. 14 is a corresponding view showing the position of the spreaders following their operation on the lasting margin;

FIG. 15 is a corresponding view showing the position of the clamps when brought into operation;

FIG. 22 is a side elevation illustrating in partly diagrammatic fashion the control means for the several operations;

FIG. 22a is a detail of an adjustment for the carriage leveling means;

FIG. 23 is a wiring diagram for the control means;

FIG. 23a is a wiring diagram of a secondary circuit controlling the locking clamps for the wipers;

FIG. 23b is a vertical section through one of the wiper locking clamps; and

FIG. 24 is a diagram of the motor means effecting operation of the several parts of the apparatus.

The machine, as hereinafter described, is designed to operate on an upper 2, which has previously been assembled together with an insole 4 on a last L, for example on a pulling-over machine where the upper is stretched on the last and pulling-over tacks 6 are inserted at the toe and heel temporarily to hold the upper in position prior to lasting.

Figure 1:
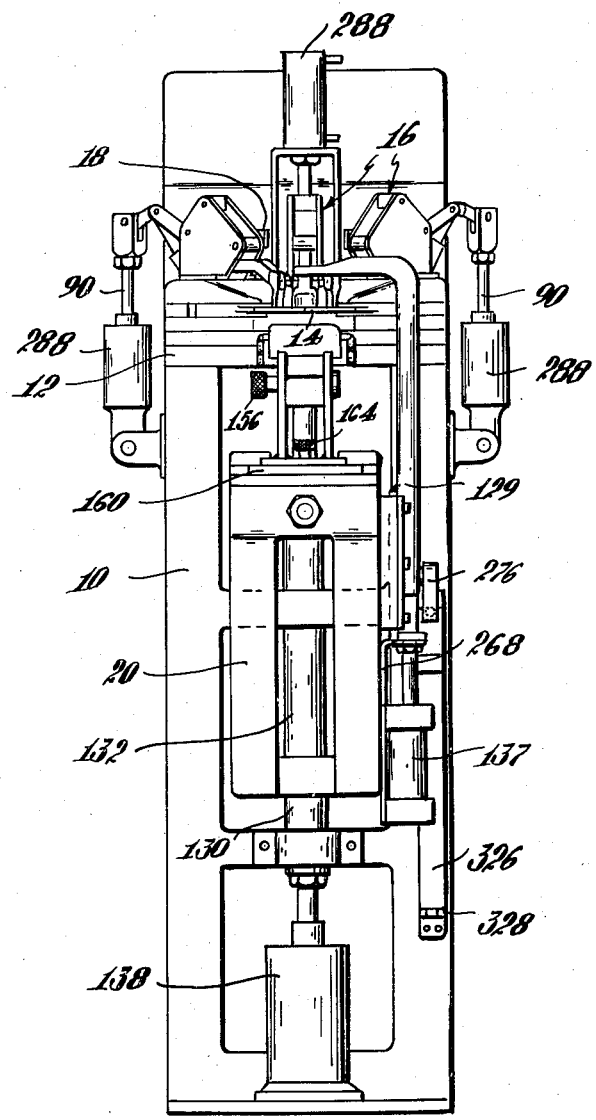
FIG. 1 is a front elevation of the machine embodying my invention.

As herein illustrated, the machine has an upright frame 10 (FIGS. 1 and 2), which mounts a rigid, horizontally disposed block 12 for supporting wiping means 14 for horizontal movement and also for supporting spreading and clamping instrumentalities 16 and 18, operable upon the lasting margin of an upper which has been temporarily assembled on a last together with an insole and secured thereto by pulling-over tacks to assist in stressing the upper heightwise of the shoe preparatory to wiping action and a carriage 20 (FIGS. 1 and 2) for supporting toe clamping means 22 and heel clamping means 24 for holding the shoe assembled on the last in a position to be operated upon by the spreading and clamping instrumentalities and wiping means, and providing interiorly thereof from for housing suitable motor means and their controls for effecting operation of the several instrumentalities.

Figure 3:
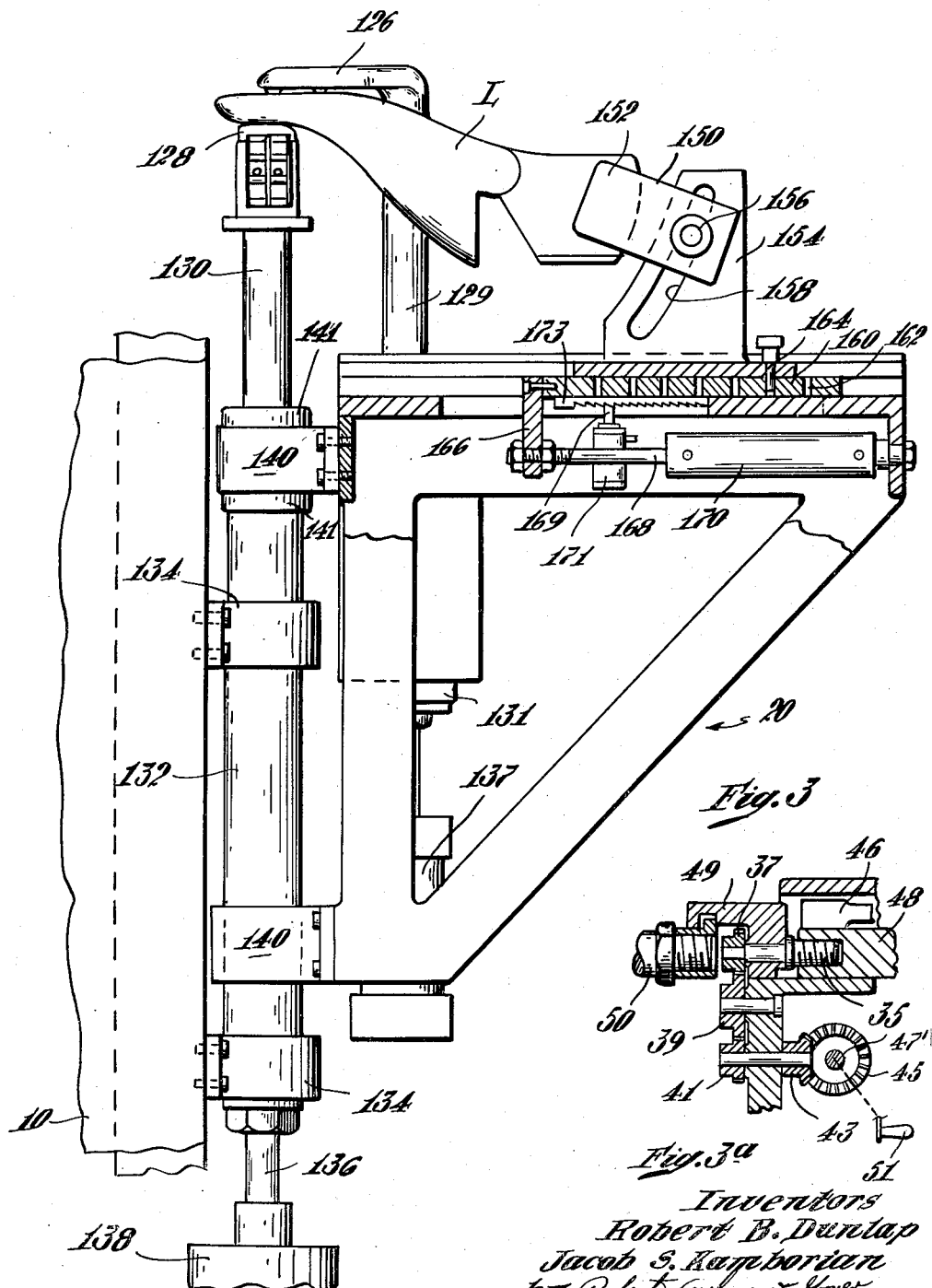
FIG. 3 is a fragmentary side elevation as seen from the left side of FIG. 1, to much larger scale and partly in section, showing in particular the shoe supporting and clamping means.
Figure 4:
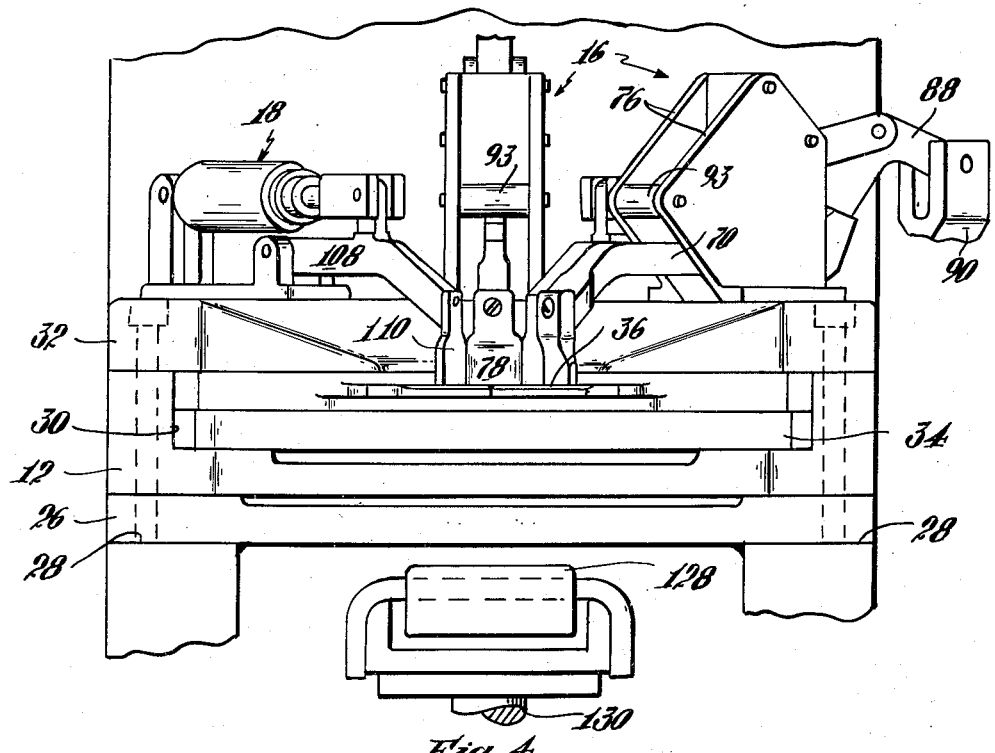
FIG. 4 is a fragmentary front elevation to larger scale showing the spreading and clamping instrumentalities.
Figure 7:
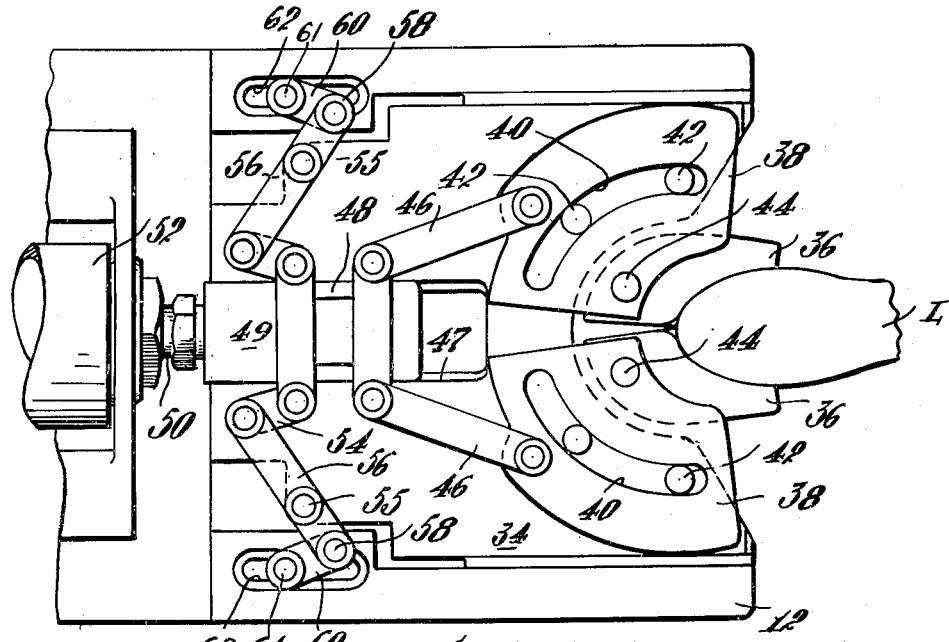
FIG. 7 is a plan view similar to FIG. 6, but showing the jaws of the wipers closed about the toe end of the shoe.
Figure 6:
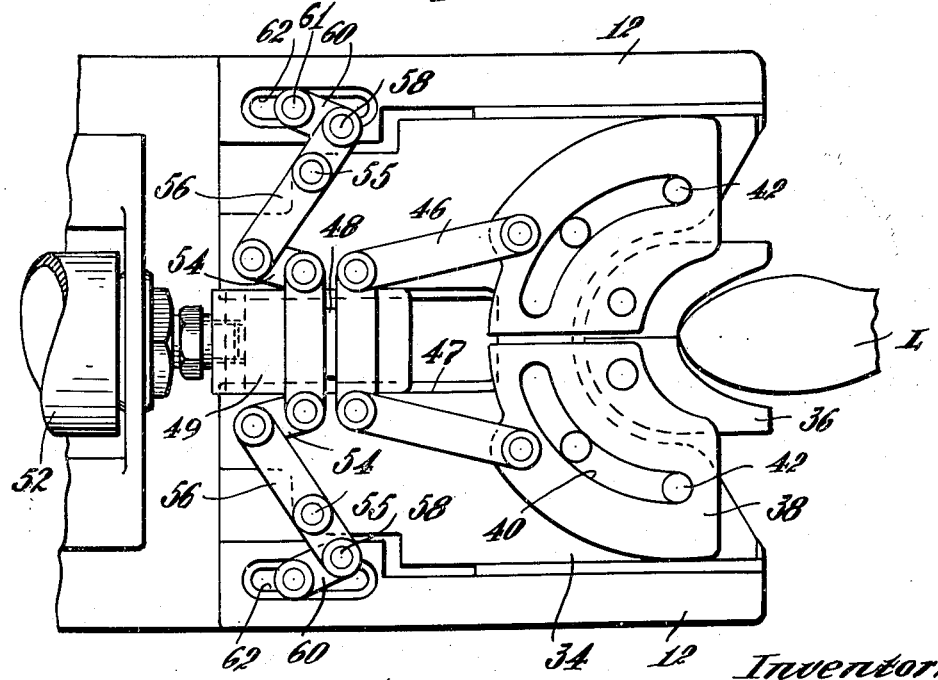
FIG. 6 is a plan view of the wipers and their operating mechanism showing the wipers in engagement with the toe end of the shoe.

Referring specifically to FIGS. 4, 6 and 7, the block 12 rests upon and is appropriately secured to a plate 26 disposed horizontally, widthwise of the frame, on spaced parallel shoulders 28—28 on the sides of the frame near the upper part thereof. The wiping means and its operative mechanism are housed within a recess 30 in the block 12 which is covered by a cap 32. The bottom of the recess 30 provides support for a horizontally disposed plate 34 which is slidable a limited amount forwardly and rearwardly and which in turn supports wiper actuating cam plates 38 (FIGS. 6 and 7), containing recesses at their forward ends, in which are secured wiper blades 36. The cam plates 38 have the usual arcuate cam slots 40, which engage pins 42 fixed to the subjacent plate 34 for controlling the movement of the cam plates and hence movement of the wiper blades to close them about the toe of the shoe. The forward ends of a pair of links 46 are pivotally connected to the cam plates and at their rear ends to a block 48, slidable in a slot 47 in the plate 34. The block 48 is connected by way of an adjustable coupling 49, at its rear end, to a piston rod 50 projecting forwardly from a cylinder 52 for forward and rearward movement. The cylinder 52 is mounted within the frame and is provided with suitable connections for its operation, as will appear hereinafter. The coupling 49 carries a screw 35 (FIG. 3a), one end of which is threaded into the block 48 and the other end of which has fast to it a pinion gear 37 so that by rotating the gear the screw may be turned to move the block 48 forwardly or rearwardly with respect to the coupling. Rotation of the gear 37 is effected by a train of gears 39, 41 and 43, the latter meshing with a gear 45 fast to a shaft 47' having a handle 51 accessible from the outside of the base.

The coupling 49 has pivotally connected thereto a pair of short links 54 (FIGS. 6 and 7), which extend rearwardly and to the rear end of which are pivotally connected a pair of laterally extending levers 56, which in turn are pivotally connected intermediate their ends to the plate 34 at 55. The forward ends of the levers 56 are pivotally connected at 58 to a pair of links 60, the rear ends of which are fixed in slots 62 of the block 12.

As thus constructed when a shoe is presented to the wipers preparatory to the wiping operation the end of the shoe is placed with its forward extremity in engagement with the bottom of the arcuate opening between the wipers, as shown in FIG. 6. In their wide open position, the edges of the wipers will diverge from the sides of the shoe, rearwardly of the forward end, a greater or lesser amount depending upon the size and style of the shoe. For best wiping operations, it is desirable to have the edges of the wipers conform to the shape of the shoe before the wiping operation is commenced, accordingly, by means of the aforementioned handle 51 the gears 39, 41, 43 and 45 are rotated to turn the gear 37 and hence the screw 35 in a direction to close the jaws of the wipers about the end of the shoe, as shown in FIG. 7.

Alternatively the jaws may be brought into conformation with the end of the shoe automatically prior to the wiping operation by releasing the pivots 61 (FIG. 23b) securing the ends of the links 60 so that they are free to slide along the slots 62 and admitting fluid pressure to the cylinder 52 so as to advance the rod 50. As the rod 50 advances the coupling 49 and block 48 transmit forward motion to the plate 34 and hence to the normally wide open wiper blades, by way of the links 54, until the wipers come to bear against the extreme forward end of the toe. At this point the forward movement of the plate 34 is stopped by engagement of the wipers with the end of the shoe, whereupon, further forward movement of the block 48 advances the links 46 so as to swing the cam plates 38 apart and to bring the wipers together about the end of the shoe. The further forward movement of the block is permitted after the plate 34 is brought to a stop by engagement of the wipers with the end of the shoe by rearward movement of the rear pivoted ends 61 of the links 60 in the slots 62. As the wipers come into engagement with the sides of the shoe the pressure is cut off and the wipers lock in their advanced position. To this end a pressure sensitive switch 33 (FIG. 23a) is connected to the fluid pressure line at the rear end of the wiper actuating cylinder 52 (FIG. 22), so that when the wipers are stopped and the pressure reaches a predetermined amount a relay will be pulsed to actuate a fluid control valve 35' (FIG. 23a) to supply fluid pressure to clamping cylinders 65 which lock the pivot points 61 in their slots, holding the wipers fixed. Each clamping cylinder 65 is secured to the underside of the plate 12 (FIG. 23b) and contains a piston 67 and rod 69. A compression spring 71 is situated below the piston and normally holds the latter in contact with a block 73 at the upper end of the cylinder. The rod 69 extends upwardly through the block, through the plate 12 and a collar 75 and is connected or may be an integral extension of the pivot 61. At the upper end of the pivot 61 there is a lock washer 77 or the like which bears against the top of the arm 69. The collar 75 is seated in a recess flush with the top of the plate 12. As thus constructed, when the piston is pulled down the lock washer and collar frictionally resist movement of the arm thus locking the wipers in position. The block 73 contains a port 79 for connection to the valve 35′, by means of which fluid pressure is delivered to the cylinder 65 when the resistance of the cylinder 52 reaches a predetermined amount.

During the actual wiping operation the wipers are moved further forward over the bottom of the shoe, the shoe being lowered to permit this movement, and simultaneously inward toward each other by the combined forward movement of the plate 34 and inward swinging movement of the wipers to lay the entire margin at the toe down and during this time pressure is applied to the shoe support in an upward direction to press the lasted margin against the underside of the wipers, as will appear hereinafter.

Figure 5:
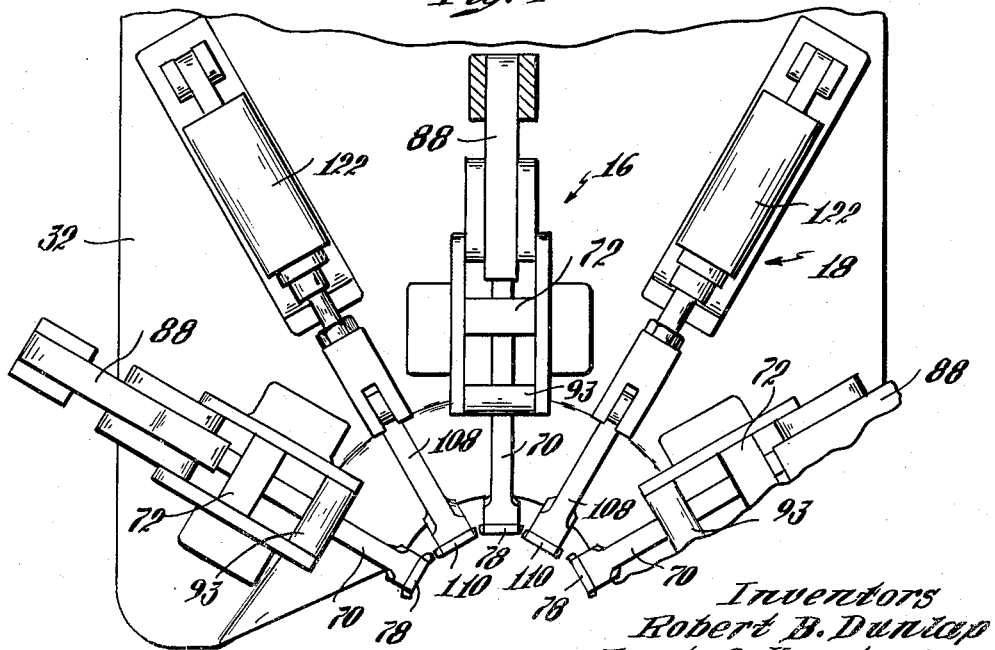
FIG. 5 is a plan view of the top of the machine showing the spreading and clamping instrumentalities.

The instrumentalities 16 and 18 for spreading the lasting margin and clamping it against the wipers after the latter have been moved into engagement with the toe are mounted on the block 12, above the wipers, in a position to operate on the lasting margin, preparatory to the wiping operation, and their arrangement and operation are illustrated specifically in FIGS. 4, 5 and 8 to 15 inclusive. There are three spreader instrumentalities 16, as shown in FIG. 5, one of which is situated at the extreme forward end of the toe of the shoe so as to be on the median line from toe to heel of the shoe and to be operable on the forward extremity of the lasting margin and the other two of which are located laterally at opposite sides thereof for engagement with portions of the lasting margin just forwardly of the pulling-over tacks at the sides of the toe, as shown in FIG. 13. The clamping instrumentalities 18, of which there are two, as shown in FIG. 5, are located in the spaces at opposite sides of the foremost spreader and the laterally situated spreaders so as to have contact with the lasting margin between the spreaders when the latter is folded outwardly, as shown in FIG. 15.

Figures 16, 17, 18:
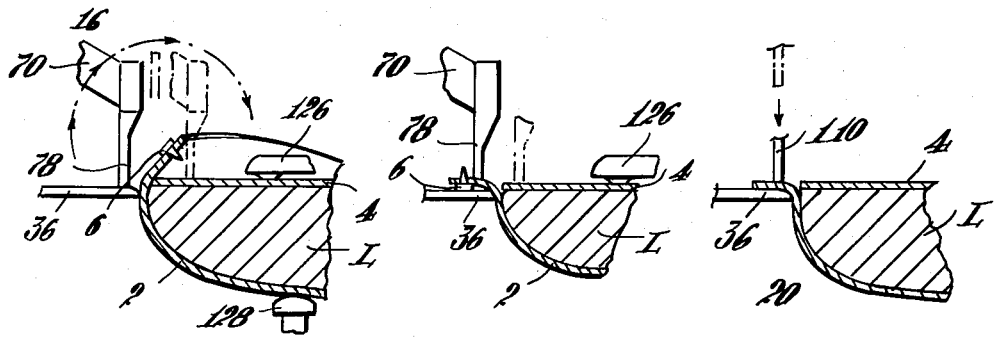
FIG. 16 is a fragmentary vertical section through the forepart of the last showing the path of movement of one of the spreaders as it moves from its initial position inwardly over the lasting margin to the inner side into contact with the upper surface of the insole.
FIG. 17 shows the position of the spreader after it has moved outwardly away from the insole to clamp the margin against the wipers.
FIG. 18 is a vertical section showing the path of movement of one of the clamps.

The spreaders 16 are designed to move from an initial position having contact with the wipers (FIG. 16), upwardly, inwardly over the lasting margin, downwardly into contact with the upper surface of the insole, inside of the inwardly tacked margin and then outwardly while in contact with the insole, as shown in FIG. 17, to drag the lasting margin away from the insole and fold it outwardly into engagement with the wipers, the endmost spreader during this movement removing the pulling-over tack at the end. During this movement of the spreaders the last L is supported with the upper surface of the insole above the plane of the wipers so that the lasting margin, when folded outwardly away from the insole, is pulled away from the extreme edge of the insole to expose it. Following operation of the spreaders, which pull the lasting margin outwardly over the wipers and presses it frictionally into engagement therewith, the clamps, one of which is shown in FIG. 18, move downwardly into engagement with the outspread margin, their movement being substantially directly downward from an elevated position above the wipers into engagement with the margin, between the spreaders. The spreading and clamping instrumentalities have narrow, curved, elongate lower edges (FIG. 19), which collectively have contact with substantially the entire lasting margin about the toe, so as to hold the latter firmly engaged with the wipers during the subsequent operations of lowering the last to impart heightwise tension to the upper and inward movement of the wipers to fold the lasting margin into contact with the bottom, the action of the spreader and clamping instrumentalities however being such as to snub the margin over the edges of the wipers so that tension is maintained in the margin until it is finally secured to the insole.

The spreader instrumentalities 16, as shown in FIGS. 4 and 8 to 10 inclusive, each comprise an arm 70 pivotally supported intermediate its ends, at the lower end of a link 72, the upper end of which is pivotally supported on a horizontal pin 74 mounted between a pair of spaced parallel, vertically disposed plates 76 fastened at their lower edges to the block 12. The forward end of each arm 70 carries a finger 78 which has a narrow elongate lower edge generally parallel to the edge of the shoe. The rear end of the arm 70 is pivotally connected to the lower end of one arm 80 of a bell crank lever 82, the latter being pivotally connected at its knee to the rear end of a link 84. The forward end of the link 84 is pivoted at 86 between the plates 76. The other arm 88 of the bell crank lever has pivotally connected to it a rod 90 by which motion may be imparted to the bell crank lever. Intermediate the ends of the links 72 there are fastened at opposite sides brake pads 92 which frictionally engage the inner sides of the plates 76 and which yieldingly resist swinging movement of the links 72 about the axis of the pin 74 at its upper end. As thus constructed, when movement is imparted to the rod 90, downwardly in the direction of the arrow (FIG. 8), counterclockwise movement of the bell crank 82 is initially resisted by the brake pads 92, which opposing movement also oppose movement of the lower arm 80 of the bell crank. Accordingly, the downward pull operates to swing the link 84 downwardly about its pivot 86 so that the lower arm 80 is displaced downwardly and depresses the rear end of the arm 70. Since the latter is pivotally supported at the lower end of the link 72, its forward end rises to the dotted line position shown in FIG. 8, until it is stopped by engagement with an abutment in the form of a roller 93 mounted between the plates 76. Elevation of the arm 70 is sufficient to raise the finger 78 above the upper edge of the lasting margin (FIG. 16). Further downward movement on the rod 90 now swings the lower arm 80 of the bell crank inwardly, overcoming the resistance of the brake pads 92 so that the arm 70 is now advanced forwardly over the edge of the lasting margin, as shown in FIGS. 9, 16 and 17. Forward movement of the arm is limited by contact with the inner end of an adjustable screw 94, threaded through a block 96 fastened between the plates 76, and having at its outer end a knurled knob 98 by means of which it may be adjusted. The movement of the rod 90 is now reversed (FIG. 10) so that upward movement is applied to the arm 88 of the bell crank lever 82. Again, because of the brake pads 92, motion applied to the bell crank 82 in a direction to move its arm 80 clockwise is opposed, hence the bell crank is displaced upwardly by movement of the link 84 clockwise about its pivot 86, so that the arm 70 is swung downwardly about the pivot at the lower end of the link 72, until the lower end of the finger 78 engages the upper surface of the insole. Further upward movement of the rod 90 then swings the bell crank about its pivot 84, overcoming the resistance of the brake pads 92, so as to move the arm rearwardly, as shown in FIGS. 10 and 17, dragging the finger 78 outwardly across the insole and folding the lasting margin outwardly into engagement with the wipers. Rearward movement of the link 72 is limited by an adjustable screw 100, threaded through a boss 102 on the link 72, the inner end of which is adapted to bear against a block 106 fastened between the plate 76 and the outer end of which has a knurled knob 104, by which it may be adjusted.

The clamping instrumentalities 18, shown in FIGS. 11 and 12, each comprise an arm 108 having at its forward end a finger 110, the lower edge of which is narrow and elongate and substantially parallel to the edge of the toe. The rear end of the arm 108 is pivotally supported on a pin 112 carried by a bracket 114. Intermediate the ends of the arm there is an ear 116, which is pivotally connected to a bifurcated block 118 fastened to the forward end of a rod 120, the latter extending from a cylinder 122. The cylinder 122 is pivotally supported on a pin 124 also carried by the bracket 114. When fluid pressure is supplied to the cylinder 122 to advance the rod 120, the arm 108 is lowered, swinging in an arc about its support 112, however, as it nears its point of engagement with the lasting margin initially spread outwardly over the wipers, its motion is substantially perpendicular so that it imparts no lateral movement to the margin but merely clamps it into engagement with the subjacent wipers.

Figure 2:
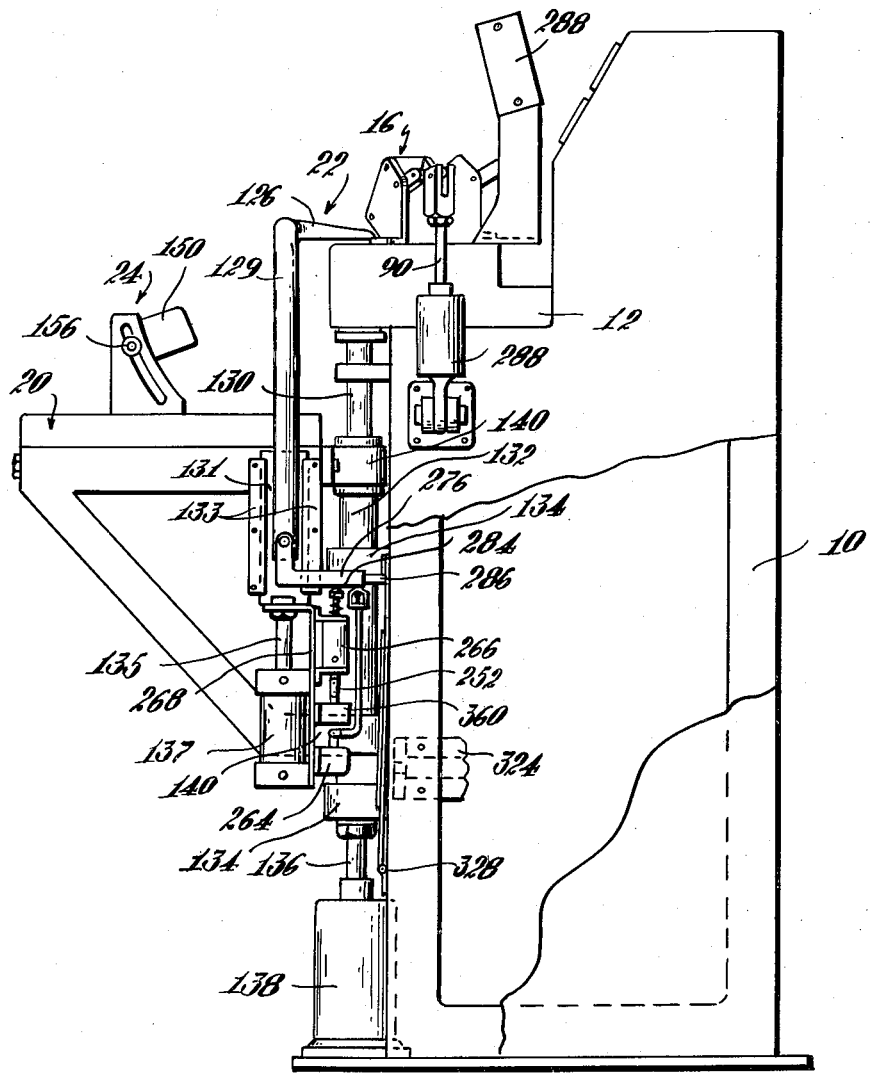
FIG. 2 is a side elevation as seen from the right side of FIG. 1.

The shoe upper assembly which has been previously mounted on a last, for example in a conventional pulling-over machine and fastened thereto by pulling-over tacks, located at the tip and opposite sides, is initially supported in a position to be operated upon by the spreaders, clampers and wipers, with the bottom of the inner sole above the level of the wipers, as shown for example in FIGS. 16, 17 and 18, by the toe and heel clamping means 22 and 24 (FIG. 2), carried by the carriage 20, which are illustrated in more detail in FIGS. 1 to 3 and 21. Referring specifically to FIG. 3, the toe clamp comprises jaws 126 and 128, the former having contact with the upper surface of the insole on the bottom of the last and the latter having contact with the top of the toe at the underside of the last. It is desirable that the jaws should be automatically operable to effectively clamp the toe of any shoe presented thereto regardless of its vertical thickness with reference to its bottom and that it should position the shoe with the bottom of the insole at a predetermined level relative to the wipers. To this end the jaw 128 (FIGS. 3 and 22), which in effect is a rest upon which the toe is placed, is mounted on the upper end of a post 130 which is slidably and rotatably supported by a sleeve 132, which is fastened to the front of the frame 10 by vertically spaced collar brackets 134. The lower end of the sleeve 132 is connected to a rod 136 extending from a cylinder 138 fastened to the base of the frame 10. Movement of the rod 136 in the cylinder in response to fluid pressure admitted thereto will thus effect vertical movement of the post 130 and hence vertical movement of the jaw 128.

The carriage 20 is mounted on the sleeve 132 by vertically spaced brackets 140, the upper one of which is supported between collars 141—141 on the sleeve, so as to be swingable on the sleeve about the vertical axis of the post 130 and supports the clamping jaw 126 and the heel clamping means 24. As shown in FIG. 2, the clamp 126 is at the upper end of a post 129, the lower end of which is fastened to a plate 131 slidable vertically in spaced parallel ways 133, which are fastened to the carriage so as to be movable vertically, relative to the carriage and to the clamp 128. The lower end of the plate 131 is secured to the upper end of a rod 135 protruding from a cylinder 137, the latter being fastened to the carriage and movable therewith. By admitting fluid pressure to the cylinder 137, the post 129 and hence the clamp 126 may be moved vertically.

The heel clamping means 24 (FIG. 3) consists of a block 150, having diverging jaws 152 for engagement with opposite sides of the heel, mounted on a post 154 and adjustable to various heights thereon by means of a clamp bolt 156 engaged within an arcuate slot 158. The post 154 is adjustable mounted on a plate 160 containing a plurality of spaced holes 162 adapted to receive a locating pin 164 at the base of the post to fix the position of the post relative to the plate. The plate 160 is in turn slidable forwardly and rearwardly on the carriage and to this end is connected at one end to a bracket 166, which in turn is connected to the end of a rod 168 protruding from a cylinder 170 mounted on the underside of the carriage. By supplying fluid pressure to the cylinder 170, the post 154 and hence the heel clamping jaws 152 may be advanced or retracted with reference to the heel end of the shoe. A latch pin 169, protruding from a cylinder 171, is movable into engagement with a toothed bar 173 to hold the heel clamp non-yieldingly in position after it has been moved into engagement with the heel.

Figure 19:
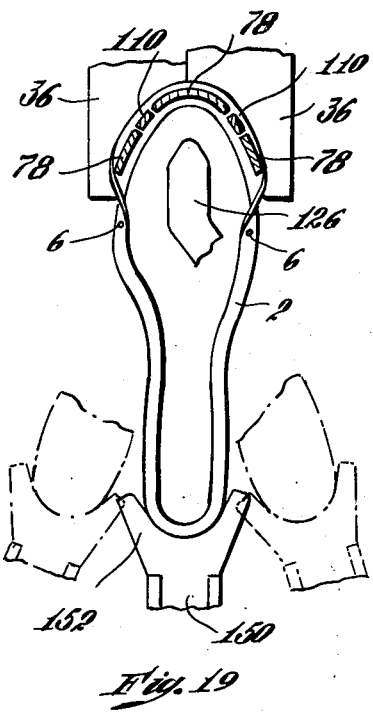
FIG. 19 is a plan view showing the shoe clamped at its forward end by means of the spreading and clamping instrumentalities and supported at its rear end by a heel clamp for movement of the heel end laterally from side to side.

From the foregoing it is clear that when the last with the upper assembled thereon is clamped between the jaws 126, 128 and 152, the entire shoe may be swung laterally, that is, from side-to-side, about a center which coincides with the vertical axis of the rod 130, as shown in FIG. 19.

Figure 20:
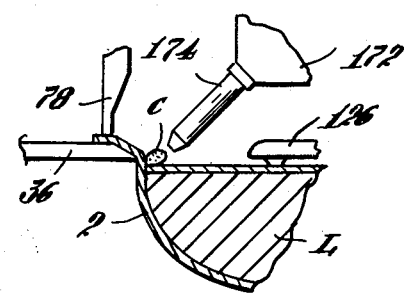
FIG. 20 is a vertical fragmentary section showing the last lowered so that the upper surface of the insole is in the plane of the undersurface of the wipers and with adhesive applied to the extreme edge of the insole and showing also an applicator.
Figure 21:
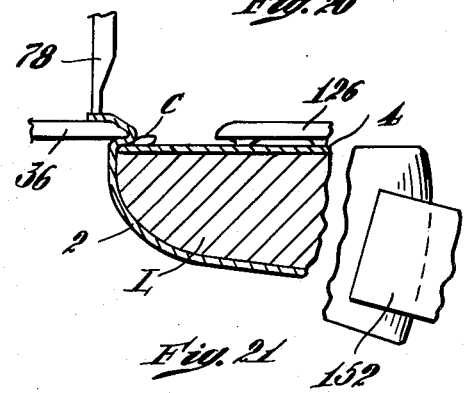
FIG. 21 is a vertical section showing the wipers advancing inwardly over the bottom.

In accordance with the invention, after the last with the upper assembled thereon is clamped with the bottom of the insole above the plane of operation of the wipers and the spreading and clamping instrumentalities have been actuated to fold the lasting margin outwardly and clamp it into engagement with the wipers, the last is lowered while the margin is still gripped to a position in which the lower side of the insole is in a plane below the lower surface of the wipers (FIGS. 20 and 21). The distance between the bottom surface of the insole and the lower surfaces of the wipers should be enough to permit the lasting margin to be wiped in between them and, of course, may be varied depending upon the thickness of the upper stock. The downward movement of the last operates to stress the lasting margin heightwise and hence to pull the upper snugly about the toe. At this point, in spite of the heightwise stressing, there may still remain some creases in the upper which desirably should be removed before lasting. Such creases and/or wrinkles can be largely obviated by grasping the heel end of the last or the rear part of the carriage 20 and moving it laterally from side-to-side (FIG. 19), as was pointed out above. When such wrinkles and creases, as may be present, have been removed to the satisfaction of the operator, a ribbon of adhesive $c$ (FIG. 20), is applied to the extreme edge of the insole. For this purpose, an adhesive dispensing device 172, provided with a nozzle 174, which can be placed close to the edge of the insole for applying adhesive to it may be employed. Preferably, the device is provided with means for melting the adhesive and keeping it liquid and is readily movable to lay the bead of adhesive entirely around the end of the toe, quickly and uniformly. The device may be suspended from a bracket on the machine so that it may be moved into and out of position at the will of the operator. Following the application of the adhesive, the wipers are moved inwardly over the bottom of the insole (FIG. 21), pushing the lasting margin which is snubbed over their forward edges, by the spreading and clamping instrumentalities, forwardly so as to lay it down against the bottom while still under tension. Depending upon the width of the lasting margin, the spreading and clamping instrumentalities retain their grip on the lasting margin until the wipers have nearly reached the innermost extent of their movement. A fast-setting adhesive is employed which will spread without squeezing out as the margin is laid down and sets quickly enough so that, when the wipers are withdrawn, the lasting margin remains where laid down without pull back or creep. While the wipers are fully advanced, the carriage is forced upwardly at an increased pressure to bed the margin against the underside of the wipers. When sufficient time has elapsed, according to the experience and judgment of the operator, the wipers are retracted, the shoe clamping means released and the shoe removed.

Optionally, cold adhesive or latex may be employed and/or the margin of the upper may be precoated with an adhesive which is pressure and/or heat responsive to produce a permanent bond when the margin is laid down under pressure and/or heat. Heat may be applied through the wipers by heating the latter.

Operation of the apparatus is semiautomatic, being initiated and carried through to completion by a three-position switch or by three buttons or levers operable in succession. For simplicity, the operation will be described as effected by movement of three push buttons. Prior to commencing operation of the apparatus, the last with the shoe assembled thereon is placed on the toe rest with its forward end substantially in engagement with the open wipers at the bottom of the concave opening defined by their edges and then the handle 51 is turned to swing the wipers into conformance with the end of the shoe. Following this, movement of the first button operates to bring the toe and heel clamps 126, 128 and 152 into engagement with the last so as to hold it bottom side up, adjacent the wipers, with the bottom of the insole in a plane above the plane of the wipers, to actuate the spreaders and clamping instrumentalities to spread the lasting margin outwardly and press it into engagement with the wipers and finally to lower the last to bring the plane of the insole into the plane of the underside of the wipers; movement of the second button operates to advance the wipers inwardly over the bottom of the shoe to lay the margin against the bottom and to apply bedding pressure to the inlasted margin; and movement of the third button operates to withdraw the wipers, disengage the clamps from the toe and heel so that the shoe may be removed and re-elevate the carriage to its initial position. The means for effecting the foregoing operations consist of a combination of fluid operated cylinders and electrically operated valves for controlling the flow of fluid to them. as will now be described.

Referring to FIGS. 23 and 24, the control panel 200 has three push buttons (not shown), the first of which when depressed shifts a blade 202 from a contact 204 to a contact 206 and the second of which when depressed shifts a blade 208 into engagement with a contact 210. The switch is cumulative in its construction so that the blade 202 remains in engagement with contact 206 when blade 208 is shifted into engagement with contact 210. Depression of the third button mechanically returns the blade 202 into engagement with the contact 204 and disengages the blade 208 from the contact 210.

When the machine is at rest and is connected to a source of power, current is normally supplied through a conductor 212 to the switch blade 202 and to conductors 207 and 209, respectively. Current supplied to conductor 209 energizes a coil 374 which holds a valve 376 open so that full pressure is supplied to the apparatus from a source of pressure S. Current supplied through switch 202, contact 204 and conductor 214 energizes coil 216 of valve 218, which supplies fluid pressure to the cylinders 137 and 170 in directions to hold the toe clamps and heel clamps retracted. Pressure regulators $r^1$, $r^2$, $r^3$ and $r^4$ are interposed between the valve 376 and the several conductor pipes leading to the various motors to permit controlling the pressure in certain motors for reasons which will now appear. Current is also supplied from the conductor 214 through conductor 219 to the coil 220 of a relay 222, which holds the latch in this relay retracted so that the switch 224 is closed and the switch 226 open. Current is delivered through conductor 207, through normally closed switch 228 to a coil 230 which operates a valve 232 for supplying fluid pressure to the forward ends of cylinders 122 for holding the clamps elevated. The switch 234 is open so that the coil 236 is unenergized and hence its valve 238 is shifted to a position to block flow of pressure fluid to the rear ends of the cylinders 122. The coils 240 and 242 of the relay 244, in which the switches 228 and 234 are situated, are at this time unenergized. Coils 246 and 248 which control respectively valves 250 and 252 are unenergized, however, valve 250 is normally open when its coil is unenergized while valve 252 is normally closed when its coil is unenergized. Thus pressure fluid is supplied through the open valve 250 to the forward ends of the cylinders 288 so as to hold the spreaders retracted and in engagement with the wipers.

By depressing the first button on the control panel 200, the switch 202 is moved into engagement with the contact 206 which de-energizes coils 216 and 220. De-energization of the coil 220 allows the latch in this relay to engage the blade 224 and hold it closed. Current is now supplied through contact 206 and through conductor 254 to a coil 256 which shifts a valve 258 to supply fluid pressure to the upper end of the cylinder 137, to bring the toe clamp jaw 126 into engagement with the shoe. Current is also supplied through conductor 260 and a normally closed switch 262 to a coil 264 which, through means now to be described, will shift a valve 266 in a direction to admit pressure fluid to the upper end of the cylinder 138 so as to move the carriage downwardly. The coil 264 is fastened to a bracket 268 (FIG. 22) mounted on the rod 135 protruding from the cylinder 137 and is movable therewith. The coil 264 when energized pulls downwardly on a rod 270 which has at its upper end a head 272 situated within a yoke 274, fastened to an arm 276, the latter being pivotally connected at 278 to the post 129. A spring 280 is interposed between the head 272 and the bottom of the yoke so that the connection between the rod 270 and the arm 272 is yielding. A stem 282 rises from the valve 266 into engagement with the arm 276 and is yieldingly held thereagainst by a spring 284. As thus constructed, when the coil 264 is energized, the rod 270 pulls the arm 276 downwardly thereby depressing the stem 282 and shifting the valve 266 in a direction to admit pressure fluid to the top of the cylinder 138 and hence to lower the carriage. The arm 276 has at its distal end a pin 286 which is arranged to slide along the surface of a block 289 secured to the frame 10 until it is stopped by engagement with a shoulder 290 which is located at the upper end of a bar 326 and which juts forwardly of said surface of the block 289 into the path of the descending pin 286. When the pin is stopped by engagement with the shoulder, further pull of the coil 264 is stopped so that the valve 266, which is of the follower type, no longer supplies fluid to the cylinder 138 and hence the carriage comes to a stop. The yielding connection between the rod 270 and the arm 276 prevents damage to the mechanism, cushioning the leveling of the carriage at this point.

Current is also supplied through conductor 292, the closed switch 224 and conductor 293 to a coil 294, which closes a normally open switch 296, thereby supplying current from the source through a conductor 297 to the motor M of a timer T. The timer has three open switches 298, 300 and 302 which are closed successively, but only instantaneously, by a cam driven by the motor M. When the first switch 298 closes, current is supplied from the contact 206 through a conductor 304, the switch 298 and conductor 306 to the coil 308 of the relay 222, which pulses this coil, thereby engaging the latch so that the switch 224 is held open and the switch 226 is held closed. This permits current to flow from the conductor 292 through the closed switch 226 and a conductor 310 to a coil 312 which shifts a valve 314 in a direction to supply pressure fluid to the cylinder 170 to bring the heel clamp into engagement with the heel end of the shoe. Opening of the switch 224 de-energizes the coil 294 which stops the motor. Current is also supplied through conductor 306 and conductor 316 to coils 246 and 248 to energize them. Energization of the coil 246 closes valve 250 so as to cut off the supply of pressure fluid to the forward ends of the cylinders 288 and simultaneously opens the valve 252 to supply pressure fluid to the rear ends of the cylinders 288, thereby to advance the spreaders upwardly and inwardly over the lasting margin. Since the switch 298 closes only instantaneously, however, the coils 246 and 248 are immediately de-energized so that the valve 252 is now closed and the valve 250 re-opened, thereby reversing the flow of pressure fluid to the cylinders 288, causing the spreaders to move downwardly into engagement with the upper surface of the insole and then outwardly to drag the lasting margin outwardly and clamp it into engagement with the wipers. The impulse travelling through the conductor 318 to the coil 240 has no effect on the latter since the latch is not engaged at that time.

Now the switch 300 is closed by the timer and current is supplied through the conductor 304, switch 300 and conductor 320 to the coil 242 of the relay 244 which opens the switch 228 and closes the switch 234, thereby de-energizing the coils 230 and energizing the coil 236, engaging also the latch so that the switches 228 and 234 are held closed and opened respectively. Energization of the coil 236 shifts the valve 238 to a position to admit fluid to the rear end of the cylinders 122 and thereby to bring the clamps down into engagement with the lasting margin resting against the wipers.

Finally, the switch 302 is closed by the timer so that current is supplied from the conductor 304 through the switch 302 and a conductor 322 to a coil 324. The coil 324 operates to swing the bar 326 (FIG. 22), the upper end of which constitutes the shoulder 290, rearwardly, to disengage the shoulder 290 from the pin 286. The bar 326 is pivotally supported at its lower end on a pin 328 and has below its upper end a shoulder 330. Disengagement of the shoulder 290 from the pin 260 permits the still energized coil 264 to pull the arm 276 downwardly again, thereby to depress the stem 282 and cause the valve 266 to supply pressure fluid to the cylinder 138 so that the carriage now moves downwardly again. Movement continues downwardly until the pin 286 strikes the second shoulder 330, whereupon the carriage is brought to a stop and in this position the upper surface of the insole is substantially in the plane of the underside of the wipers. The bar may be divided between its ends and connected by a screw so as to permit adjustment of the shoulders heightwise (FIG. 22a).

The carriage may now be moved from side-to-side to remove any stubborn creases or wrinkles in the stressed margins which were not entirely removed by the heightwise stretching of the margin. When this has been accomplished to the satisfaction of the operator, adhesive is applied to the exposed edge of the insole.

To effect wiping of the lasting margin, which should be done quickly following the application of adhesive, the second button on the panel 200 is depressed so as to bring the blade 208 into engagement with the contact 210. This supplies current through conductor 332, normally closed switch 334 and conductor 336 to a coil 338. Energization of coil 338 shifts a valve 340 so as to supply fluid pressure to the cylinder 52 in a direction to advance the wipers. Simultaneously a coil 342 is energized which shifts a valve 344 to supply fluid pressure to the cylinder 171 which advances the latch 169 to lock the heel clamp into position. A coil 348 is also energized to actuate a counter (not shown). As the wipers advance normally closed switch 262 is opened so as to de-energize coil 264, thereby releasing the pull on the arm 276. The spring 284 on the stem 282 is thus allowed to move the arm 276 upwardly so that pressure is delivered to the lower side of the cylinder 138 to raise the carriage and hence to press the bottom of the shoe against the underside of the wiper at a pressure of about 30 pounds per square inch, controlled by the pressure regulator $r^2$. As the wipers near their forward movement, a switch 350 is closed so that current is supplied through conductor 260, switch 350 and conductor 316 to the coils 248 and 246, thereby energizing them and shifting the valves 250 and 252 to closed and open positions respectively, thereby supplying fluid pressure to the rear ends of the cylinders 288 to lift the spreaders out of engagement with the lasting margin as the latter is being wiped into engagement with the insole. Since the current supplied through the switch 350 is continuous, fluid pressure is supplied to the rear ends of the cylinder and holds the spreaders elevated as long as the switch 350 remains closed. Current is also supplied through conductor 318 to the coil 240 of relay 244 so as to disengage the latch, thereby allowing the switch 234 to open and the switch 228 to close. Energization of the coil 230 raises the clamps away from the lasting margin. At the forward extremity of movement of the wipers, the switch 334 is shifted by a switch actuator 400 movable with the piston rod 50 (FIG. 22) to supply current through a conductor 352 to a coil 354 which in turn shifts a valve 356 to supply high pressure fluid through regulator $r^1$, to the valve 266, to supplement that supplied thereto through regulator $r^2$, and thence to the cylinder 138 to increase the pressure between the shoe and the underside of the wipers to provide full line bedding pressure from the source for uniting the lasting margin to the surface of the insole.

The third button on the panel 200 is now depressed which, as previously pointed out, mechanically moves the switch 202 from contact 206, back to 204 and disengages switch 208 from contact 210. As a result, current is cut off from coils 256 and 312 and supplied to coil 216, which shifts the valve 218 in a direction to supply fluid fluid pressure to the lower end of the cylinder 137 and to the forward end of the cylinder 170 to retract the toe clamps and heel clamp. Current is also supplied through conductor 214 to the normally closed switch 356 and through conductor 358 to a coil 360. Energization of the coil 360 shifts valve 266 in a direction to supply fluid pressure to the upper end of the cylinder 138 and hence to draw the carriage downwardly, this being permitted by the fact that coil 264 is de-energized and hence the arm 276 is free to move upwardly. The carriage continues downwardly until it reaches the bottom where a switch actuator 402 on the post 130 (FIG. 22) closes a normally open switch 362, thereby supplying current from conductor 214 through 364 to the coil 366. Energization of coil 366 shifts the valve 340 to retract the wipers. When the wipers reach their retracted position, the switch 356 is open so as to de-energize coil 360 which allows the spring 284 to shift the valve 266 upwardly and this allows the carriage to move freely upward. At the same time, the switch 350 is opened so that coils 346 and 248 are de-energized, thereby shifting the valves 250 and 252 so as to bring the spreaders back into engagement with the wipers. This completes the cycle of operation of the machine.

As heretofore indicated, the machine may be arranged to bring the wipers into engagement with the end of the shoe automatically by way of a secondary circuit and, to this end, a switch 295 may be added to the timer T (FIG. 23a). Prior to the closing of the switch 298, by the timer motor, the switch 295 is closed to energize the solenoid 338 and thereby to cause forward movement of the wiper driving piston 50 as described above. During this forward movement the pivots 61 are in their unlocked position so that the wipers first engage the end of the shoe and then the sides of the shoe as previously described, after which the pressure-sensitive switch 33 is closed. The closing of the pressure-sensitive switch 33 energizes the latch coil 299b of a relay 299, thereby closing a switch 299a in the relay. The closing of the switch 299a energizes a solenoid 35' which actuates a valve 35'' to supply fluid pressure to the cylinders 65 thereby to lock the pivots 61 in place. By this time, the switch 295 has been opened by the timer motor so that the wipers are no longer urged forwardly. After this, the switch 298 is momentarily closed and the machine goes through its cycle as described above, with the exception that the counter actuating solenoid 348 is energized upon the closing of the switch 300 instead of the energization of the wiper-controlling solenoid 338. When the pressure is released in the cylinder 52 the pressure-sensitive switch 33 opens. Accordingly, when the third button on the panel is closed, current flows through the conductor 214 and a conductor 214' so as to energize the release coil 299c of the relay 299 thereby placing the valve 35'' in venting position so that the springs 71 vent the cylinders 65 through the valve 35'' and unlock the pivots 61. Automatic control of the wipers is, of course, optional and the secondary circuit may be disconnected, when desirable, to use the manual means for bringing the wipers into conformance with the end of the shoe as previously described.

Sometimes during the initial leveling and spreading of the lasting margin into engagement with the wipers, because of defects in stock or shortness of lasting margin, the margin is not properly gripped and hence it is desirable to release the shoe and start over again. For this purpose, a switch 368 is movable from a normally closed position in engagement with the contact 370 to a contact 372. This movement energizes the coil 374 which shifts the valve 376 in a direction to cut off the fluid pressure to the system. Current is also supplied by shifting of this switch through conductor 378 to the coils 240, 246 and 248, which operate to elevate the grippers and spreaders, the residual pressure in the system being sufficient to release these instrumentalities sufficiently to permit removing the shoe. The switch may then be returned to its original position and the machine is ready to start over again.

To summarize, an upper assembled on a last is placed with its toe resting on the clamp 128, substantially in a horizontal position, whereupon the switch or operating lever is moved to its first position. The clamps 126 and 128 come together and bring the shoe down to a position in which the upper surface of the insole is at a predetermined level above the plane of the wipers. Simultaneously, the heel clamp 152 comes into engagement with the heel end of the shoe. Within predetermined time, which is determined by the timing motor referred to, the spreader fingers come into operation and spread the lasting margin outwardly over the wipers, whereupon the clamping fingers come down into engagement with the outspread margin and clamp those portions of the margin between the spreaders into engagement with the wipers. At the end of another time, also determined by the timing motor, the last is moved downwardly while the lasting margin is clamped to a position in which the upper surface of the insole is substantially in the plane of the underside of the wipers. At this position, the machine comes to rest until the actuating switch is moved to its second position. At this time, the operator has an opportunity to examine the shoe and to work out additional wrinkles or creases by swinging the shoe laterally if he finds it necessary and then to apply a strip of adhesive to the extreme edge of the insole, preparatory to bringing the wipers into engagement. As quickly as possible after applying the adhesive, the operator moves the switch to its second position, whereupon the wipers move inwardly over the bottom and as they approach the end of their movement, the carriage is moved upwardly so as to apply a bedding pressure to the lasting margin. At this point, the machine again comes to a stop where it will remain until the operator actuates the switch a third time, whereupon the wipers are withdrawn, the toe and heel clamps are retracted so that the shoe can be removed and the carriage re-elevated to its normal position.

It should be understood that the present disclosure is for the purpose of illustration only and that this invention includes all modifications and equivalents which fall within the scope of the appended claims.

We claim:

1. In a lasting machine, wiping means operable in a predetermined plane, means mounting a last, bottom up, with an upper and insole assembled thereon, with the toe adjacent the wipers, and with the bottom of the insole in a plane spaced from and parallel to the wipers, said means including relatively movable clamps for engagement with the top and bottom of the toe, and means automatically operable to effect variable movement of the mounting means and clamps according to the depth of the last to bring the clamps into engagement with the toe in a position in which the plane of the bottom of the insole bears a predetermined relation to the plane of the wipers.

2. In a lasting machine, wiping means movable in a predetermined plane, a carriage movable vertically with respect to the plane of movement of the wiper means, said carriage mounting spaced jaws for engagement with the top and bottom sides of the last, at the toe, to hold the latter adjacent the wiper means, and means automatically operable to effect variable compound movement of the carriage and clamps to bring the clamps according to the depth of the last into engagement with the toe whatever the perpendicular thickness of the toe may be at a level such that the bottom of the last lies in a plane spaced from and parallel to the plane of the wipers.

3. In a lasting machine, wiper means movable in a predetermined plane, a carriage movable relatively with respect to the plane of movement of the wiper means, said carriage mounting a heel clamp and a pair of spaced, relatively movable toe clamps for engagement with the heel and toe of the last, and means automatically operable to effect variable compound movement of the carriage and toe clamps according to the depth of the last to bring the toe clamps together on the toe with the bottom of the last parallel to and spaced above the plane of the wipers by a predetermined amount.

4. In a lasting machine, wipers movable in a predetermined plane, a carriage movable vertically with respect to the plane of the wipers, said carriage mounting a pair of spaced, relatively movable jaws for engagement with the top and bottom of the toe to hold it rigidly on the carriage at a predetermined level with respect to the wipers, means for effecting variable vertical movement of the carriage according to the depth of the last, other means for effecting variable relative movement of the jaws according to the depth of the last, and control means for initiating and automatically terminating operation of said means to bring the jaws together and move the carriage in a direction such that the jaw having contact with the bottom of the last occupies a predetermined position above the wipers regardless of the depth of the last.

5. In a lasting machine, wipers movable in a predetermined plane, means mounting a last bottom-up for supporting an insole and upper assembled thereon, in a position to be operated on by said wipers, said mounting means initially supporting the last with the bottom above the plane of the wipers, means disposed above the wipers about the toe of the last externally thereof, and means for moving said last-named means to the inner side of the margin and then outwardly for simultaneously drawing the lasting margin at the forward end and at portions spaced at opposite sides therefrom, forwardly and outwardly over the edge of the insole into engagement with the wipers while the latter occupy their inoperative position and then to press said outspread portions downwardly against the wipers.

6. In a lasting machine, wipers movable in a predetermined plane from a retracted inoperative position to an operative position, means mounting a last bottom-up with its toe between the wipers for supporting an insole and upper assembled thereon in a position to be operated upon by the wipers, said last-named means initially holding the bottom of the last above the plane of the wipers, and fingers, normally disposed symmetrically about the toe, outwardly of the last, and in contact with the wipers, said fingers being movable upwardly, inwardly and downwardly into engagement with the inner side of the inwardly folded lasting margin and then outwardly to draw the margin forwardly and laterally away from the edge of the insole into engagement with the wipers and for clamping the margin against the wipers, linkage for effecting movement of the fingers and means for effecting movement of the last downwardly to bring the upper surface of the insole into a plane below the undersides of the wipers while the lasting margin is held clamped outspread by an amount sufficient to permit the margin to be wiped inwardly over the bottom.

7. In a lasting machine, wipers movable in a predetermined plane from a retracted inoperative position to an operative position, means mounting a last bottom-up with its toe between the open wipers for supporting an insole and upper assembled thereon, with the bottom of the insole above the plane of the wipers, three spreader fingers disposed about the end of the toe outwardly of the last and symmetrically with respect to the tip for movement, inwardly of the inwardly folded lasting margin and then outwardly and downwardly progressively to fold the margin outwardly into engagement with the upper surface of the wipers, thereby to expose the extreme edge of the insole, linkage for effecting movement of the fingers, and means for lowering the last to bring the upper surface of the insole below the level of the undersides of the wipers by an amount sufficient to permit the outspread margin to be wiped inwardly between the underside of the wiper and the upper surface of the insole.

8. In a lasting machine, wipers movable in a predetermined plane from an inoperative to an operative position, means mounting a last bottom-up with its toe between the open wipers and its bottom above the plane of the wipers, fingers normally disposed about the toe outwardly of the last in contact with the wipers, with one finger forwardly of the tip and the others at opposite sides thereof, and linkage for imparting claw-like movement to the fingers to engage the inwardly folded margin and pull it forwardly away from the edge of the insole into engagement with the upper side of the wipers and to hold the margin outspread, and means for lowering the last to bring the upper surface of the insole into a plane below the underside of the wipers while the outspread margin is thus held.

9. In a lasting machine having wipers movable in a predetermined plane, means for supporting a last with an insole and upper assembled thereon, with the bottom surface of the insole above the plane of the wipers, a plurality of spreading and clamping instrumentalities arranged about the toe of the last, there being a clamping instrumentality between each pair of spreading instrumentalities, said spreading instrumentalities having contact with the wipers and said clamping instrumentalities being situated above the wipers, means for effecting movement of the spreading instrumentality inwardly over the upstanding margin to the inner side thereof and then downwardly and outwardly to fold the margin outwardly and clamp it against the wipers, and other means for thereafter moving the clamping instrumentalities downwardly into clamping engagement with the outspread margin intermediate the spreading instrumentality.

10. In a lasting machine having wipers movable in a predetermined plane, means for supporting a last with an insole and upper assembled thereon, with the bottom surface of the insole above the plane of the wipers, a plurality of spreading and clamping instrumentalities, arranged about the toe end of the last, there being a spreading instrumentality at the extreme front end and one spaced therefrom at each side, and there being a clamping instrumentality situated in the spaces between the endmost spreading instrumentality and each side spreading instrumentality elevated from the wipers, means yieldingly holding the spreading instrumentalities in contact with the wipers so that the point of contact therewith is below the plane of the insole, means for effecting movement of the spreading instrumentalities upwardly from their point of contact with the wipers inwardly above the upstanding margin, downwardly into contact with the insole behind the margin and outwardly and downwardly to fold the margin outwardly and downwardly against the wipers, and means for moving the clamping instrumentality downwardly into engagement with the outspread margin, yieldingly to clamp it against the wipers.

11. In a lasting machine having wipers movable in a predetermined plane, means for supporting a last with an insole and upper assembled thereon, with the bottom surface of the insole above the plane of the wipers, a plurality of spreading and clamping instrumentalities, means connected to said instrumentalities to cause them to operate successively, to fold the margin outwardly and downwardly into engagement with the wipers and to clamp the outwardly folded margin against the wipers intermediate the spreaders, said instrumentalities having elongate areas which collectively engage the margin about substantially the entire toe.

12. In a lasting machine having wipers movable in a predetermined plane, means for supporting a last with an insole and upper assembled thereon, with the bottom of the insole above the plane of the wipers, said means being movable about an axis near the toe of the last, perpendicular to the plane of the bottom of the insole and on the longitudinal axis of the last, means for folding the margin outwardly over the wipers and clamping it down against the wipers, to snub the margin over the edge of the wipers, and means for lowering the last to bring the bottom surface of the insole below the plane of the lower side of the wipers while the margin is still snubbed about the wipers, to impart a powerful heightwise stress to the margin, said supporting means being swingable from side-to-side about said axis while the last is held in said lowered position to impart twisting forces to the margin to remove stubborn creases.

13. In a lasting machine having wipers movable in a predetermined plane, means for supporting a last with an insole and upper assembled thereon, with the bottom surface of the insole above the plane of the wipers, said means being movable about an axis near the toe of the last, perpendicular to the plane of the insole and on the longitudinal axis of the last, instrumentalities for folding the margin outwardly over the wipers and clamping it down against the wipers to snub the margin over the edge of the wipers, means for lowering the last to bring the bottom surface of the insole below the plane of the lower side of the wipers, while the margin is still snubbed about the wipers, to impart a powerful heightwise stress to the margin, said supporting means being swingable from side-to-side about said axis while the last is held in said lowered position to impart twisting forces to the margin, and mechanism for moving the wipers inwardly over the bottom while said instrumentalities frictionally oppose release of the snubbed margin.

14. In a lasting machine having wipers movable in a predetermined plane and means for supporting a last with an upper assembled thereon, with the bottom of the insole above the plane of the wipers, spreader instrumentalities for folding the margin outwardly and downwardly into contact with the wipers, each comprising a finger normally having contact with the upper surface of the wiper, means suspending the finger intermediate its ends for swinging and rocking movement about axes parallel to the plane of the wipers, and an actuating linkage connected to the rear end of the finger operable to elevate the finger, move it forwardly, lower it and retract it.

15. In a lasting machine having wipers movable in a predetermined plane and means for supporting a last with an upper assembled thereon, with the bottom of the insole above the plane of the wipers, spreader instrumentalities for folding the margin outwardly and downwardly into contact with the wipers, each comprising a finger normally having contact with the upper surface of the wipers, means suspending the finger intermediate its ends for movement about vertically spaced axes parallel to the plane of the wipers, means connected to the rear end of the finger for imparting movement thereto, and means constraining the initial movement imparted to the finger to a direction heightwise of the plane of the wipers, followed by movement in a direction inwardly over the bottom of the last.

16. In a lasting machine having wipers movable in a predetermined plane, and means for supporting a last with an upper assembled thereon, with the bottom of the insole above the plane of the wipers, spreader instrumentalities for folding the margin outwardly, and downwardly into contact with the wipers, each comprising a finger normally having contact with the upper surface of the wipers, means suspending the fingers intermediate their ends for swinging and rotary movement about vertically spaced, horizontal axes parallel to the plane of the wipers, means connected to the rear end of each finger to impart motion thereto, means operative as motion is imparted to the finger to constrain it to movement in a direction to elevate the operative end of the finger and other means operative when the finger has reached a predetermined height to cause the finger to swing bodily in a direction to move the operative end of the finger inwardly over the bottom of the last.

17. In a lasting machine having wipers movable in a predetermined plane and means for supporting a last with an upper assembled thereon, with the bottom of the insole above the plane of the wipers, spreader instrumentalities mounted above the wiper for folding the margin outwardly and downwardly into contact with the wiper, each comprising a finger, one end of which normally has contact with the upper surface of the wiper, means suspending the finger intermediate its ends for swinging and rotary movement about vertically spaced axes parallel to the plane of the wipers, means connected to the opposite end of the finger operative to impart movement to the finger, a brake associated with the means suspending the finger, opposing movement thereof, so that force applied to the end of the finger rotates it in a direction heightwise of the last and a stop situated in a position to be engaged by the finger when the latter reaches a predetermined height to limit upward movement, whereupon force applied to the finger overcomes the brake, so that the finger then moves inwardly at said height over the bottom of the last.

18. In a lasting machine, a base, wipers mounted thereon for movement in a predetermined plane and means on the base for supporting a last with an upper assembled thereon, with the bottom of the insole above the plane of the wipers, spreader instrumentalities mounted on the base for folding the margin outwardly and downwardly into contact with the wipers, each comprising a finger, one end of which initially has contact with the upper surface of the wipers, means suspending the finger intermediate its ends for swinging and rotary movement about vertically spaced axes parallel to the plane of the last, means connected to the opposite end of the finger to effect movement thereof and means for constraining said movement to upward, forward, downward and rearward movement including a brake operative to constrain swinging movement of the means suspending the finger and a stop operative to limit heightwise movement of the finger.

19. In a lasting machine, a base, wipers mounted thereon for movement in a predetermined plane, and means on the base for supporting a last with an upper assembled thereon, with the bottom of the insole above the plane of the wipers, spreader instrumentalities mounted on the base for folding the margin outwardly and downwardly into contact with the wipers, each comprising a finger, one end of which initially has contact with the upper surface of the wipers, a link pivotally connected at its lower end to the finger intermediate its ends, and at its upper end to the support, a bell crank, a link pivotally connected at one end to the support and at its other end to the elbow of the bell crank, one end of the bell crank being pivotally connected to the rear end of the finger, a driving member pivotally connected to the other end of the bell crank, a brake operating on the first-named link opposing free swinging movement thereof, and a stop situated in a position to limit heightwise movement of the finger.

20. In a lasting machine, a base, wipers mounted thereon for movement in a predetermined plane and means on the base for supporting a last with an upper assembled thereon, with the bottom of the insole above the plane of the wipers, spreader instrumentalities mounted on the base for folding the margin outwardly and downwardly into contact with the wipers, each spreader comprising a finger, one end of which initially has contact with the upper surface of the wipers, a link pivotally connected at its lower end to the finger intermediate its ends, and at its upper end to the support, a bell crank, a link pivotally connected at one end to the support and at its opposite end to the elbow of the bell crank, one end of the bell crank being pivotally connected to the rear end of the finger, a drive member pivotally connected to the other end of the bell crank, and means adjustably associated with the first-named link to limit swinging movement thereof.

21. In a lasting machine, wipers movable in a predetermined plane, a pair of forepart jaws arranged to support the last, and means for effecting movement of the jaws relative to the wipers to bring the bottom of the last to a predetermined level with respect to the wipers, comprising motor means operably connected to the jaws for moving the same heightwise of the wipers, a control for initiating operation of the motor means and a sensing device movable with the jaws operable when the jaws reach a position in which the bottom of the last bears a predetermined relation to the plane of the wipers to terminate operation of the motor means.

22. In a lasting machine, wipers movable in a predetermined plane, a pair of forepart jaws arranged to support the last and means for effecting movement of the jaws relative to the wipers to bring the bottom of the last to a predetermined level with respect to the wipers, comprising motor means operably connected to the jaws for moving the same heightwise of the wipers, a control for initiating operation of the motor means and a sensing device movable with the jaws having engagement with the bottom of the last operable when the latter reaches a level which has a predetermined relation to the plane of the wipers to terminate operation of said motor means.

23. In a lasting machine, wipers movable in a predetermined plane, a pair of forepart jaws arranged to support the last and means for effecting movement of the jaws relative to the wiper to bring the bottom of the last to a predetermined level with respect to the wipers, comprising motors, one connected to each jaw for effecting heightwise movement of the jaws relative to the wipers, a control for initiating operation of the motors to clamp the shoe between the jaws and to move the jaws heightwise of the wipers, and a lever movable with one of the jaws operable when the jaw reaches a predetermined level with respect to the wipers to terminate operation of the motor connected to the other jaw, said motor connected to the one jaw continuing to be operative to hold the one jaw clamped against the last supported by the other jaw.

24. In a lasting machine, wipers movable in a predetermined plane, a pair of forepart jaws arranged to support the last and means for effecting movement of the jaws relative to the wipers to bring the bottom of the last to a predetermined level with respect to the wipers, comprising pressure operated motors, one connected to each jaw for effecting heightwise movement of the jaws relative to each other and to the wipers, controls operable to supply pressure fluid to the motors to effect movement of the jaws into clamping engagement with the forepart of the shoe and heightwise movement of the jaws in unison relative to the wipers, means carried by the jaw having engagement with the bottom of the last operable when the jaw reaches a predetermined level with respect to the plane of the wipers to terminate supply of pressure fluid to the motor connected to the jaw having engagement with the top of the last to bring the latter jaw to a stop while pressure fluid continues to be supplied to the motor connected to the jaw having engagement with the bottom of the last.

25. In a lasting machine, wipers movable in a predetermined plane, a pair of forepart jaws arranged to support the last and means for effecting movement of the jaws relative to the wipers to bring the bottom of the last to a predetermined level with respect to the wipers, comprising pressure operated motors, one connected to each jaw, operable to effect movement of the jaws relative to each other and to clamp the last between them, and in unison relative to the wipers, controls operable to supply fluid to the motors, said controls including a member movable with the jaws relative to the wipers, and a stop situated in a position to be engaged by the member when the jaw having engagement with the bottom of the last bears a predetermined relation to the wipers, to terminate supply of pressure fluid to the motor connected to the jaw having engagement with the top of the last, while pressure fluid continues to be supplied to the motor connected to the jaw having engagement with the bottom of the last.

26. In a lasting machine, wipers movable in a predetermined plane, a pair of forepart jaws arranged to support the last with means for effecting movement of the jaws relative to the wipers to bring the bottom of the last to a predetermined level with respect to the wipers, comprising pressure operated motors, one connected to each jaw, operable to effect movement of the jaws relative to each other to clamp the last between them, and in unison relative to the wipers, valves operable to admit fluid pressure to said motors to bring the clamps into engagement with the last and to move the jaws in unison heightwise of the wipers, a member operable to shift each valve to admit fluid to its motor, said member operable to shift the valve controlling flow of fluid to the motor connected to the jaw which has engagement with the top of the last, being movable with the jaws relative to the wipers, and a limiting device for stopping movement of said member when the jaw having engagement with the bottom of the last reaches a predetermined position with respect to the wipers.

27. In a lasting machine, a base, wipers mounted thereon for movement in a predetermined plane, a carriage on the base movable perpendicularly with respect to the plane of movement of the wipers, jaws movable with the carriage and relative to each other, a fluid motor on the carriage operably connected to the jaw having engagement with the bottom of the last, to effect movement thereof relative to the jaw having engagement with the top of the last, a fluid motor connected to said carriage operable to effect movement thereof and hence of the jaws in unison relative to the wipers, valves operable to supply fluid to the respective fluid motors, the one of said valves for supplying fluid to the second fluid motor being mounted for movement with the jaw having engagement with the bottom of the last, an actuating member for said valve also mounted on the carriage, means for effecting actuation of said actuating member to supply fluid to said second fluid motor and means for rendering the actuating member inoperative when the jaw having engagement with the bottom of the last reaches a predetermined level with respect to the wipers.

28. In a lasting machine, wipers, a support mounting the wipers for movement in a predetermined plane, jaws, a carriage mounting said jaws for movement relative to each other and relative to the wipers, a fluid motor on the carriage connected to the jaw having engagement with the bottom of the last operable to effect movement of the jaw relative to the jaw having engagement with the top of the last, a fluid motor connected to the carriage operable to effect movement thereof, valves operable to supply fluid pressure to the fluid motors, the one of the valves for supplying fluid to the second fluid motor being mounted for movement with the jaw having engagement with the bottom of the last relative to the carriage, actuating means movable with said last mentioned jaw including a member movable relative to the valve to shift it in a direction to admit fluid to said second fluid motor, means operable to move the member to actuate the valve and means for rendering the member ineffective when the carriage reaches a level at which the jaw having engagement with the bottom of the last bears a predetermined relation to the plane of the wipers.

29. In a lasting machine, wipers, a support mounting the wipers for movement in a predetermined plane, upper and lower jaws, a carriage mounting the jaws for movement relative to each other and to the wipers, a fluid motor on the carriage connected to the upper jaw, said fluid motor being operable to effect movement of the upper jaw on the carriage relative to the lower jaw, a second fluid motor connected to the carriage operable to move the carriage and the jaws carried thereby relative to the wipers, valves for admitting fluid to the motors, a bracket mounting the valve which supplies fluid to the second fluid motor on the connection between the first fluid motor and the top jaw so that it moves therewith, a bar movable with said bracket operable to shift the valve, means on the bracket for effecting operation of the bar to shift the valve, and a limit stop fixed relative to the carriage for intercepting the bar at a predetermined level of the carriage to render said valve shifting means on the bracket ineffective.

30. In a lasting machine, wipers, a support mounting said wipers for movement in a predetermined plane, means mounting a last with an insole and upper assembled thereon for movement relative to the wipers, motivating means for effecting movement of the mounting means and controls for said motivating means, said controls being operable successively to effect movement of the mounting means in a direction to bring the bottom of the insole into a first position above the plane of the wipers and thereafter to a second position below the plane of the wipers, said controls including a control lever movable wtih the mounting means relative to spaced fixed stops, said stops being so located as to successively be engaged by the control lever when the bottom of the insole is in said first and second positions.

31. In a machine for operating on the end of a shoe, wipers, a support for supporting a last having a shoe upper and insole assembled thereon, means for moving the wipers in a predetermined plane, means for moving the support in a plane at right angles to the plane of movement of the wipers, said movements being effective to cause the wipers to move across the shoe bottom to fold the margin of the upper down against the insole and to press the shoe bottom against the wipers, control means associated with the support moving means operable to change the pressure between the shoe bottom and the wipers from a predetermined minimum to a predetermined maximum, and means movable with the wipers as they advance across the shoe bottom to actuate the control means to increase the pressure from said predetermined minimum to said predetermined maximum.

32. In a machine for operating on the end of a shoe, wipers, a support for supporting a last having a shoe upper and insole assembled thereon, means for moving the wipers in a predetermined plane, means for moving the support in a plane at right angles to the plane of movement of the wipers, said movements being effective to cause the wipers to move across the shoe bottom to fold the margin of the upper down against the insole and to press the shoe bottom against the wipers, control means associated with the support moving means operable to change the pressure between the shoe bottom and the wipers from a predetermined minimum to a predetermined maximum, and means movable with the wipers as the wipers reach the end of the wiping operation to actuate the control means to increase the pressure from said predetermined minimum to said predetermined maximum.

33. In a machine for operating on the end of a shoe, wipers movable in a predetermined plane, means mounting a last for supporting an insole and upper assembled thereon adjacent the wipers, means for effecting movement of the wipers parallel to the bottom of the shoe to advance the wipers over the bottom of the shoe, means simultaneously operable to effect movement of the mounting means perpendicular to the wipers to press the bottom of the shoe against the wipers at a predetermined pressure, means operable to increase the pressure between the bottom of the shoe and the wipers and means movable with the wipers operable when the wipers reach a predetermined position relative to the bottom to effect operation of the last-named means.

34. In a machine for operating on the end of a shoe, a base, means on the base for supporting a last with an upper and insole assembled thereon, and means mounted on the base for operating on the bottom of the shoe, comprising a support mounting a plate slidable toward and from the last, said plate carrying wipers pivotally mounted thereon, said plate containing a slot, an element slidable in the slot relative to the plate, and mechanism for effecting movement of the element, a pair of arms pivotally supported on the plate, pivots connecting the adjacent ends of the arms to the element, and means slidably connecting their remote ends to the support, a second pair of arms pivotally connected to the element and to the wipers, said first pair of arms being operable by forward movement of the element to advance the plate until the wipers contact the end of the shoe, and thereafter to swing in directions to permit the element to advance further relative to the plate, and said second pair of arms being operable by said relative movement to close the wipers on the end of a shoe.

35. In a machine for operating on the end of a shoe, a base, means on the base for supporting a last with an upper and insole assembled thereon, and the wipers for operation on the bottom of the shoe, comprising a support containing slots and mounting a plate slidable toward and from the last on said support, said plate carrying wipers pivotally mounted thereon, said plate containing a track, an element slidable along the track relative to the plate, and means for effecting movement of the element, a pair of arms pivotally supported between their ends on the plate, links pivotally connecting the adjacent ends of the arms to the element, links pivotally connected to the remote ends of the arms, and being slidably engaged with said slots in the support, a second pair of arms pivotally connected at one end to the element and at their opposite ends to the wipers, said first pair of arms being operable by forward movement of the element to advance the plate and wipers until the wipers engage the end of the shoe, and said second pair of arms being operable by relative movement of the element and plate to close the wipers on the end of the shoe.

36. In a machine for operating on the end of a shoe, a base, means on the base for supporting a last, means on the base mounting wipers for movement relative to the shoe to wipe the margin inwardly over the bottom, and to swing them relative to each other to conform to the end of the shoe, an element operably connected to the wiper mounting means and to the wipers to advance the wiper mounting means and wipers in unison, and manually operable means for adjusting said element connecting the wipers thereto, to swing the wipers on the wiper mounting means into conformance with the end of the shoe independently of the movement of the wiper mounting means.

37. In a machine for operating on the end of a shoe, a base, means on the base supporting a last, means on the base mounting wipers for movement relative to the shoe to wipe the margin inwardly over the bottom of the shoe and to swing the wipers relative to each other to close them about the end of the shoe, an element, linkage connecting the element to the wiper mounting means to effect movement thereof, other linkage connected to the element manually operable by relative movement of the element and the wiper mounting means to close the wipers about the end of the shoe, and means for adjusting the position of said other linkage relative to the element to effect relative movement of the wipers to conform them to the end of the shoe without effecting relative movement of the element and the wiper mounting means.

38. In a machine for operating on the end of a shoe, a base, wipers, means on the base for supporting the wipers in a predetermined plane, means on the base for supporting a last having a shoe upper and insole assembled thereon bottom up with the plane of the last bottom substantially parallel to the wipers and above the wipers, means supporting the wiper supporting means and the wipers for compound linear and angular movement to bring the edges of the wipers into a position to engage the end of the shoe and to close them about the end prior to wiping, means for locking the wipers in said position, engaged with the end of the shoe and conformed thereto, means for lowering the support for the last to bring the bottom of the insole below the wipers, and means for releasing said locking means and effecting compound movement of the wipers linearly and angularly over the bottom to gather the margin about the toe and lay it against the bottom.

39. In a machine for operating on the end of a shoe, means mounting a last upon which may be placed an upper and an insole assembly and wipers, with the bottom of the insole above the wipers, means supporting the wipers on the mounting means for manual adjustment of the wipers to bring them into conformance with the end of the shoe, while the bottom of the insole is above the wipers, means for lowering the last mounting means after the wipers have been brought into conformance with the end to bring the bottom of the insole below the wipers, said wiper mounting means being movable following manual adjustment of the wipers and lowering of the last to effect compound linear and angular movement of the wipers to gather the margin inwardly over the bottom of the shoe, and power operated means for effecting said compound linear and angular movement.

40. In a machine for operating on the end of a shoe, means mounting a last upon which may be placed an upper and insole assembly and wipers, with the bottom of the insole above the wipers, means for supporting the wipers on the mounting means for manual adjustment of the wipers to bring them into conformance with the end of the shoe, while the bottom of the insole is above the wipers, means for lowering the last mounting means after the wipers have been brought into conformance with the shoe to bring the bottom of the shoe below the wipers, said wiper mounting means being movable following lowering of the last to effect compound linear and angular movement of the wipers to gather the margin inwardly over the bottom of the shoe, and power operated means for effecting movement of the wiper mounting means and simultaneously to effect movement of the last mounting means to press the bottom to the shoe against the wipers as they move inwardly over the bottom.

41. In a machine for operating on the end of a shoe, means mounting a last with an upper and an insole assembled thereon and wipers for relative movement, and a switch having a first, second and third position, means operative by movement of the switch to said first position to effect relative movement of the support and wipers to conform the wipers to the end of the shoe, stress the lasting margin heightwise and terminate said relative movement when the margin has been stressed a predetermined amount, means operative by movement of the switch to said second position to effect the resumption of relative movement of the wipers and the mounting means to advance the wipers over the bottom, press the latter against the wipers to lay the margin down against the bottom and terminate said relative movement when the wipers reach the end of their wiping action, and means operative by movement of said switch to said third position to effect relative movement of the mounting means and wipers to restore them to their initial position.

42. In a lasting machine, wipers, means mounting a last with an upper and insole thereon with the end of the shoe engaged with the wipers and with the bottom of the shoe above the wipers, instrumentalities operable to spread the margin outwardly from the insole into engagement with the wipers, means operable to lower the last mounting means while the margin is engaged with the wipers to bring the bottom of the shoe below the wipers to impart a heightwise stress to the margin; power operated means for effecting operation of said instrumentalities and the means for lowering the last mounting means, controls for initiating and controlling operation of said power operated means, first to cause said instrumentalities to spread the margin, and second to cause the mounting means to lower the last, until a predetermined stress is reached, and means operable to render the control means inoperative to restore the instrumentalities to their initial position in the event that the gripping action of said instrumentalities was ineffective.

43. In a lasting machine, wipers movable in a predetermined plane, means supporting a last with a shoe insole and upper mounted thereon adjacent the wipers, powered means for moving the last supporting means in a plane substantially perpendicular to the plane of movement of the wipers, means to initiate operation of said powered means, a sensing device engageable with and movable with the insole during the movement of the last mounting means, and means operative in response to movement of said sensing device to terminate operation of said powered means when the insole contacting surface of said sensing device bears a predetermined relation to the plane of movement of the wipers.

44. In a lasting machine, wipers movable in a predetermined plane, means supporting a last with a shoe insole and upper mounted thereon adjacent the wipers, powered means for moving the last supporting means in a plane substantially perpendicular to the plane of movement of the wipers, means to initiate operation of said powered means, and sensing means cooperative with the insole operative to terminate operation of said powered means when the insole bears a predetermined relation to the plane of movement of the wipers.

45. A lasting machine comprising a frame, movable wipers mounted on the frame, a support on the frame for supporting bottom up a last having a shoe upper and insole assembled thereon, at least one spreader mounted on the frame so that it is normally positioned outwardly of the shoe, means for holding the support in a position wherein the upwardly facing surface of the insole is above the lower surface of the wipers, means for moving the spreader inwardly across the margin of the upper, downwardly into engagement with the insole, and then across the insole and outwardly thereof to lay the margin down on the wipers and press it thereagainst, means to lower the last support to a position wherein the upwardly facing surface of the insole is below the lower surface of the wipers, and means for moving the wipers across the insole to wipe the margin down against the insole.

46. A lasting machine comprising a frame, movable wipers mounted on the frame, a support on the frame for supporting bottom up a last having a shoe upper and insole assembled thereon, means for holding the support in a position wherein the upwardly facing surface of the insole is above the lower surface of the wipers, a plurality of spreaders mounted on the frame and engageable with the upwardly facing surface of the insole, means for moving the spreaders in relatively oblique directions across the insole and outwardly thereof whereby each spreader engages the margin of the upper while travelling over the edge of the last in a direction substantially radial to the last edge to lay the margin down on the wipers and press it thereagainst, means to lower the last support to a position wherein the upwardly facing surface of the insole is below the lower surface of the wipers, and means for moving the wipers across the insole to wipe the margin down against the insole.

References Cited in the file of this patent

UNITED STATES PATENTS

| | | |
|---|---|---|
| 569,017 | Ferguson | Oct. 6, 1896 |
| 780,996 | Hebert | Jan. 31, 1905 |
| 1,267,370 | Brock | May 28, 1918 |
| 1,487,915 | Brothers | Mar. 25, 1924 |
| 1,634,510 | Pym | July 5, 1927 |
| 2,505,134 | Miller | Apr. 25, 1950 |
| 2,573,886 | Zdoral et al. | Nov. 6, 1951 |

FOREIGN PATENTS

| | | |
|---|---|---|
| 208,325 | Great Britain | Dec. 20, 1923 |
| 641,311 | Germany | Jan. 27, 1937 |